Figure 13:
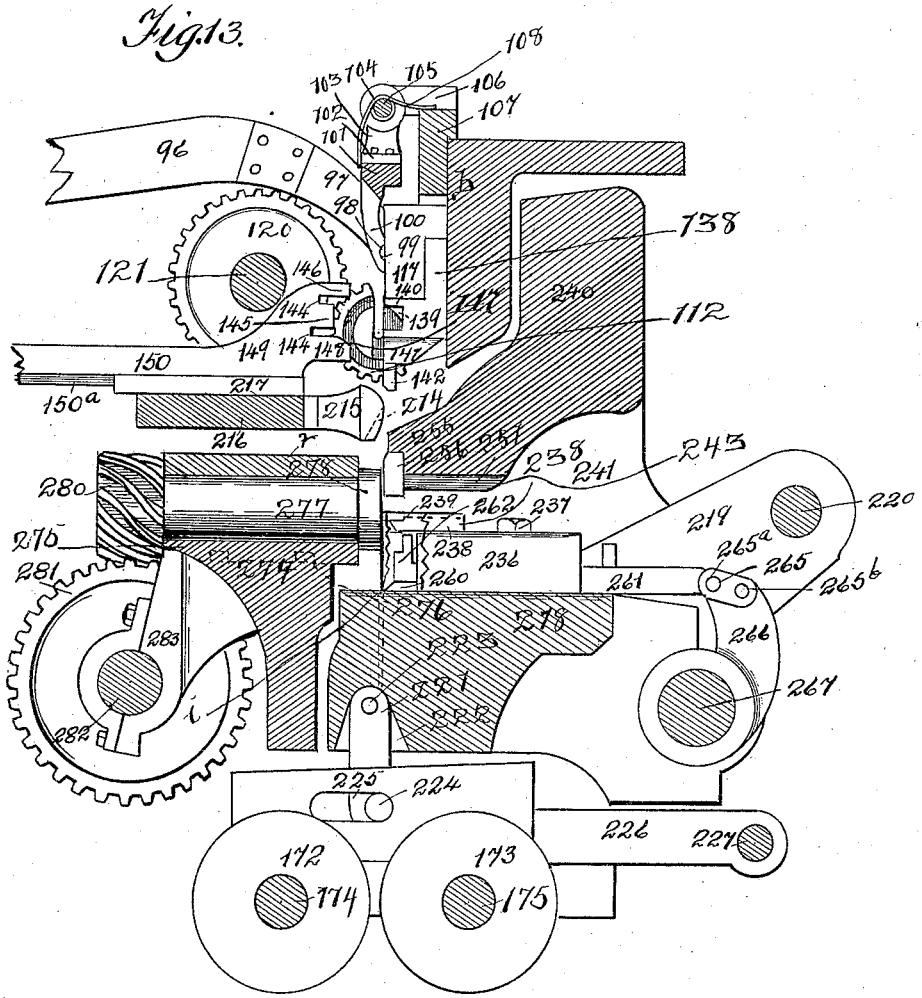

E. BARTHOLOMEW.
MACHINE FOR MAKING WIRE FENCE.
APPLICATION FILED OCT. 10, 1905.
966,156.
Patented Aug. 2, 1910.
18 SHEETS—SHEET 1.
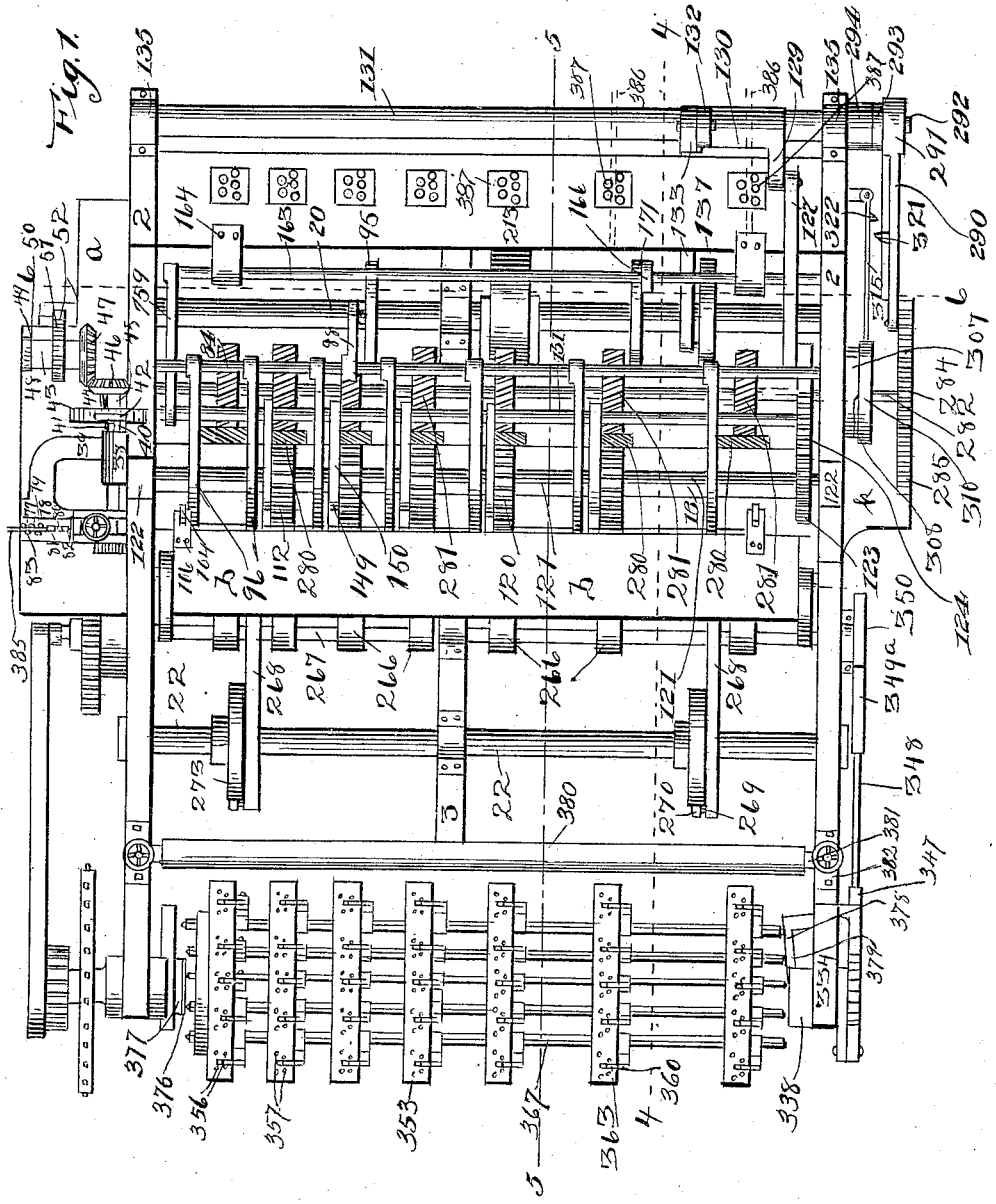

E. BARTHOLOMEW.
MACHINE FOR MAKING WIRE FENCE.
APPLICATION FILED OCT. 10, 1905.
966,156.
Patented Aug. 2, 1910.
18 SHEETS—SHEET 2.
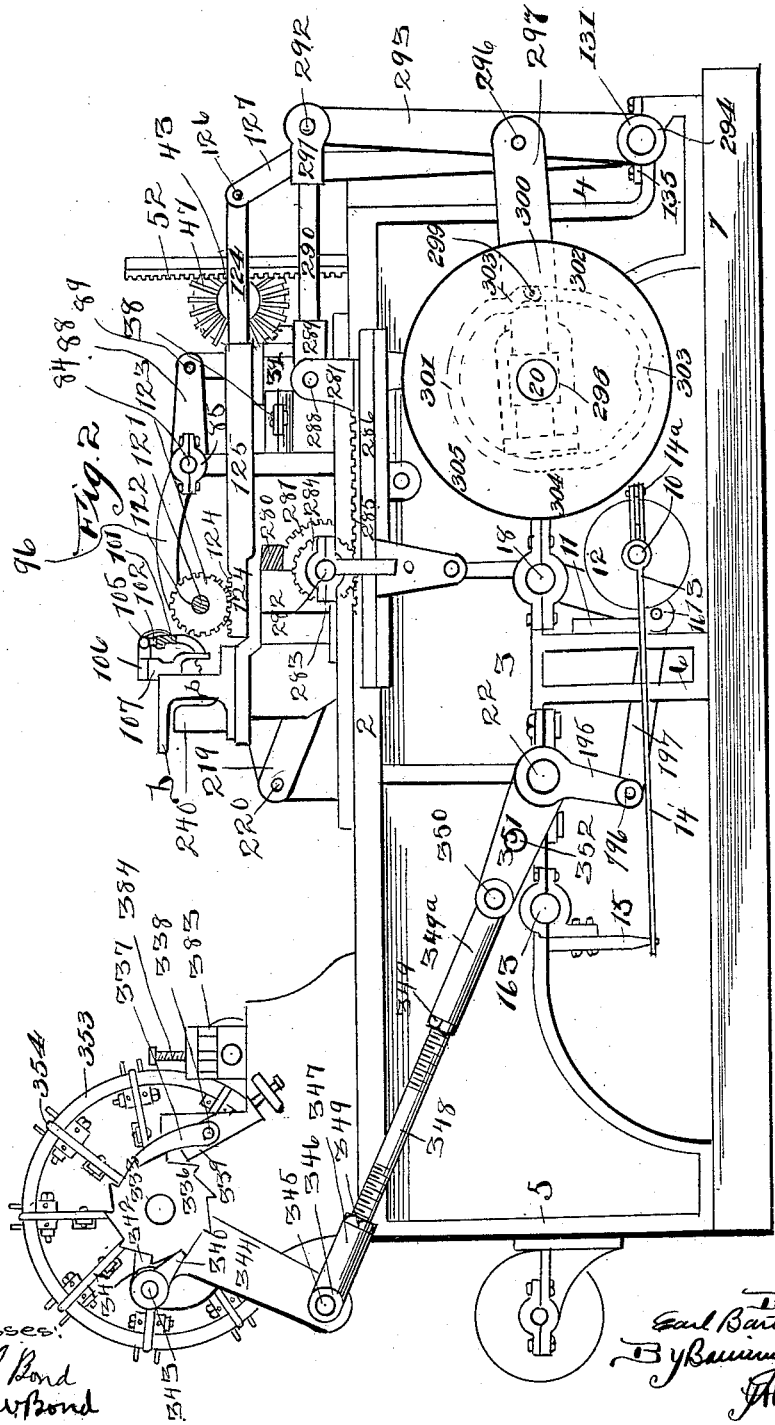

E. BARTHOLOMEW.
MACHINE FOR MAKING WIRE FENCE.
APPLICATION FILED OCT. 10, 1905.
966,156.
Patented Aug. 2, 1910.
18 SHEETS—SHEET 3.
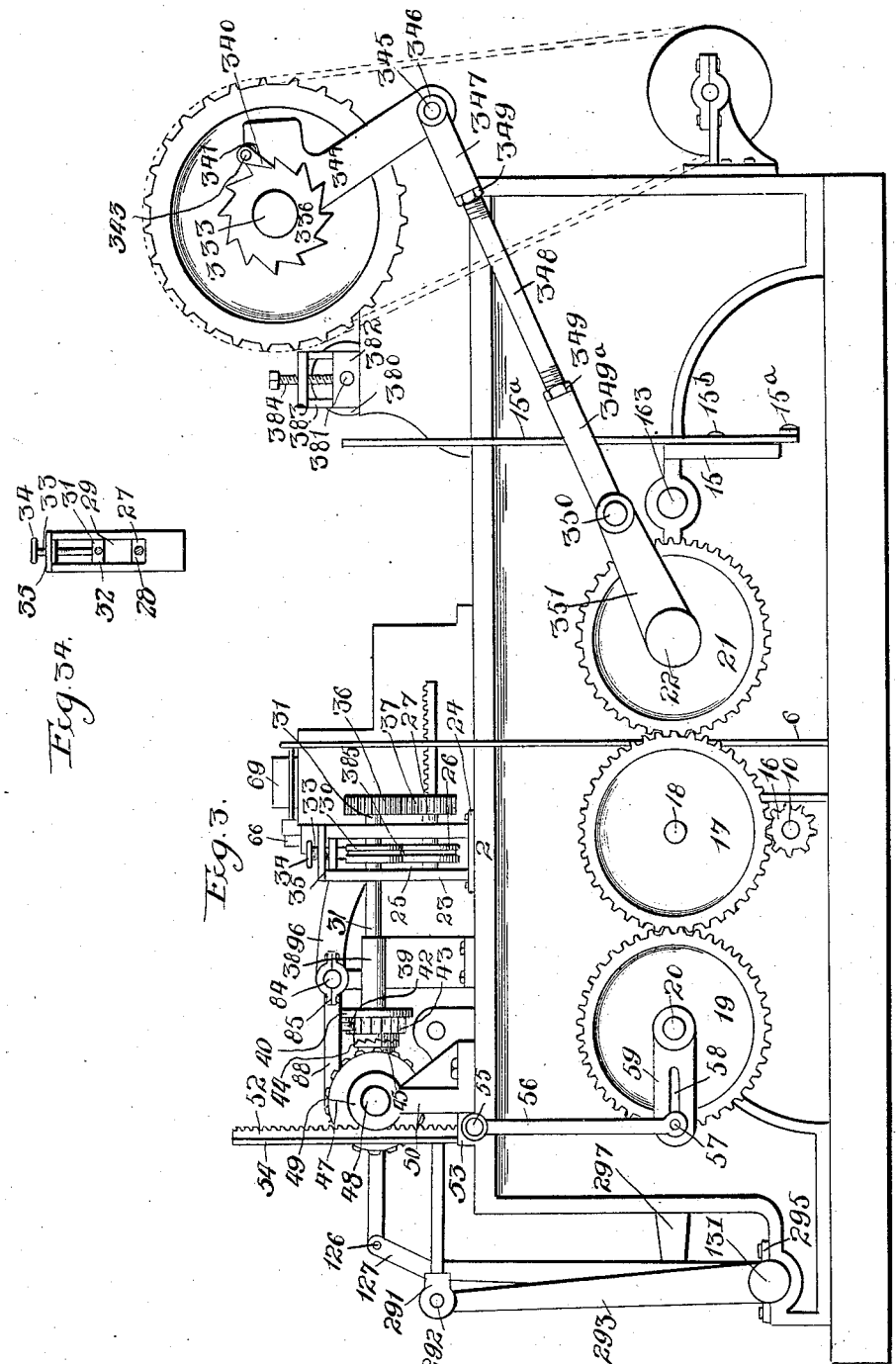
Witnesses:
Wm P. Bond
T. H. Alfuds
Inventor:
Earl Bartholomew
By Fanning & Fanning
Attys.

E. BARTHOLOMEW.
MACHINE FOR MAKING WIRE FENCE.
APPLICATION FILED OCT. 10, 1905.
966,156.
Patented Aug. 2, 1910.
18 SHEETS—SHEET 4.
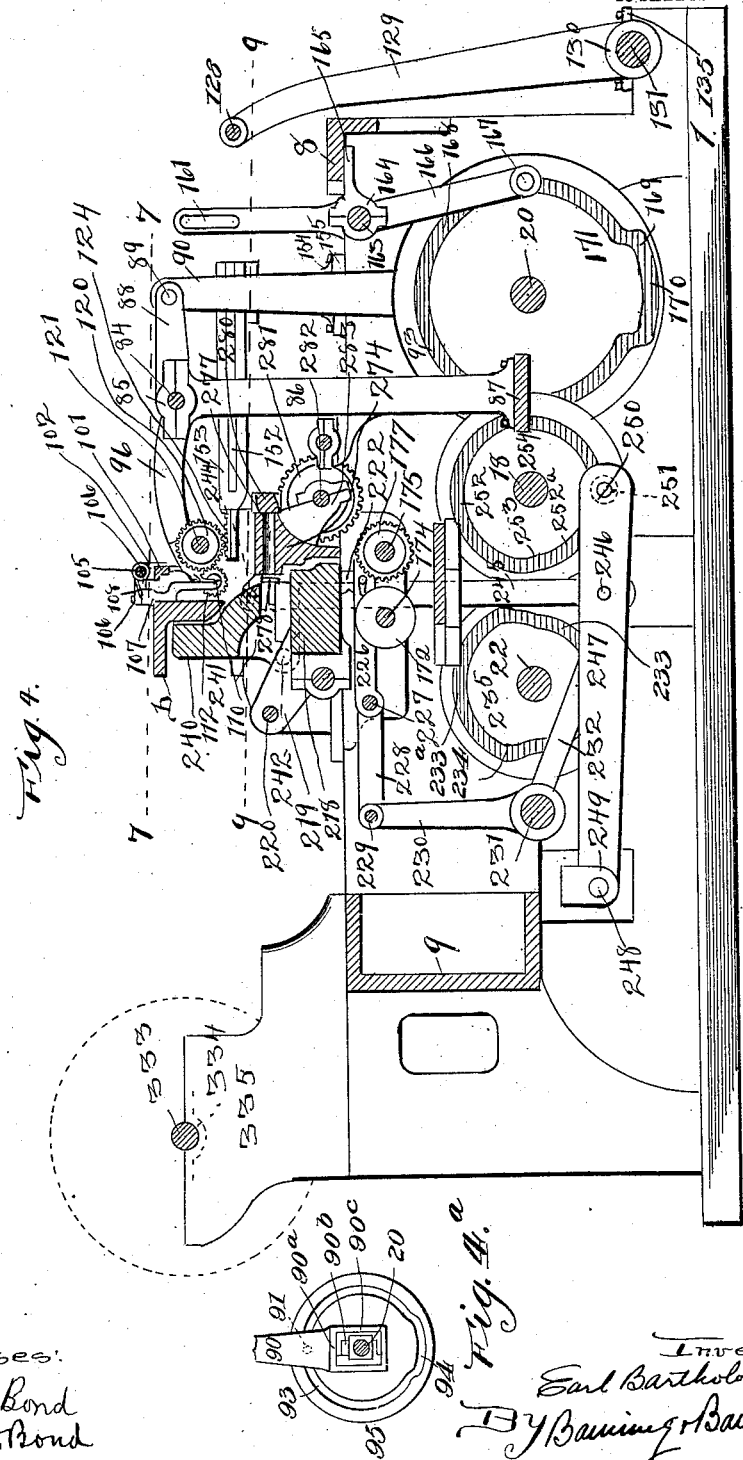

E. BARTHOLOMEW.
MACHINE FOR MAKING WIRE FENCE.
APPLICATION FILED OCT. 10, 1905.
966,156.
Patented Aug. 2, 1910.
18 SHEETS—SHEET 5.
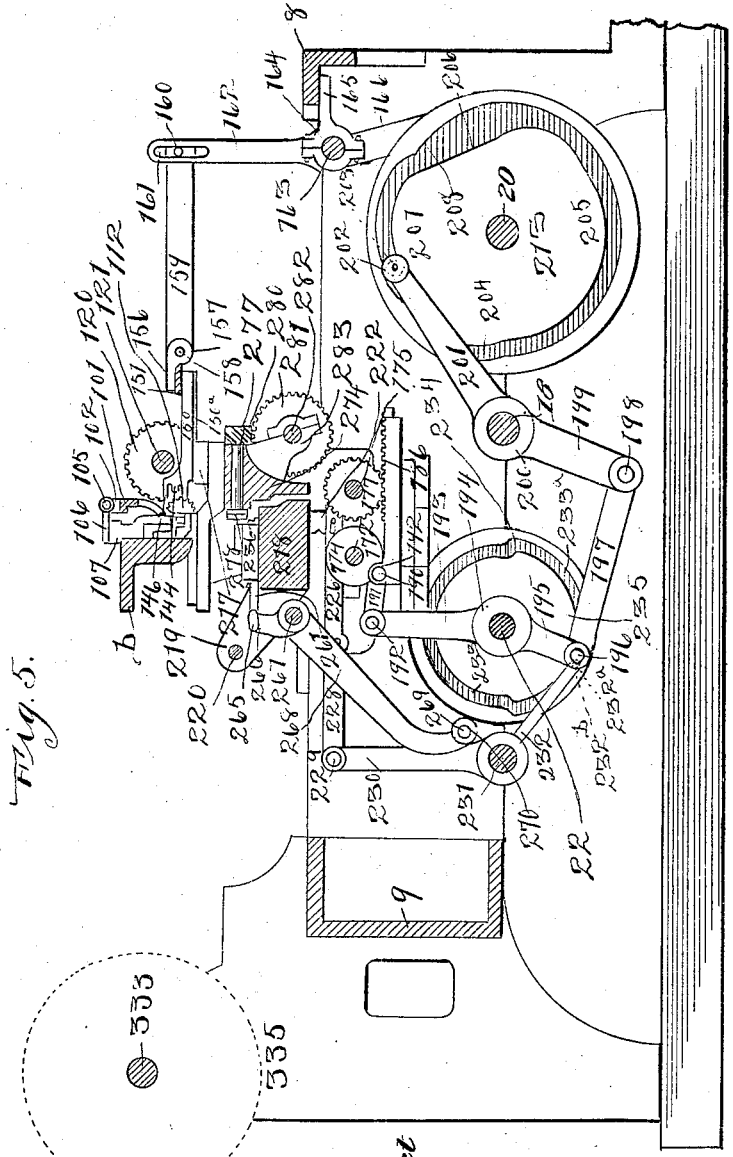
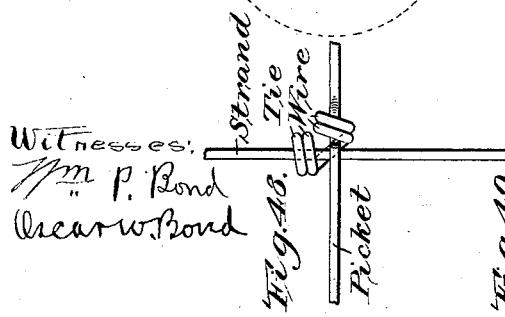
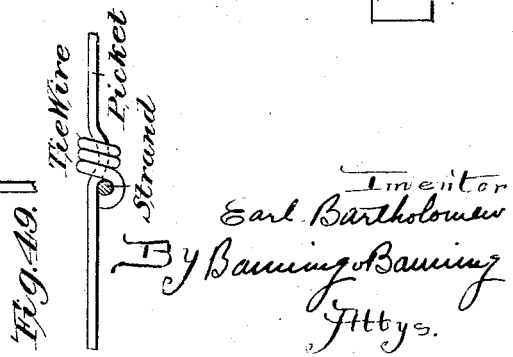

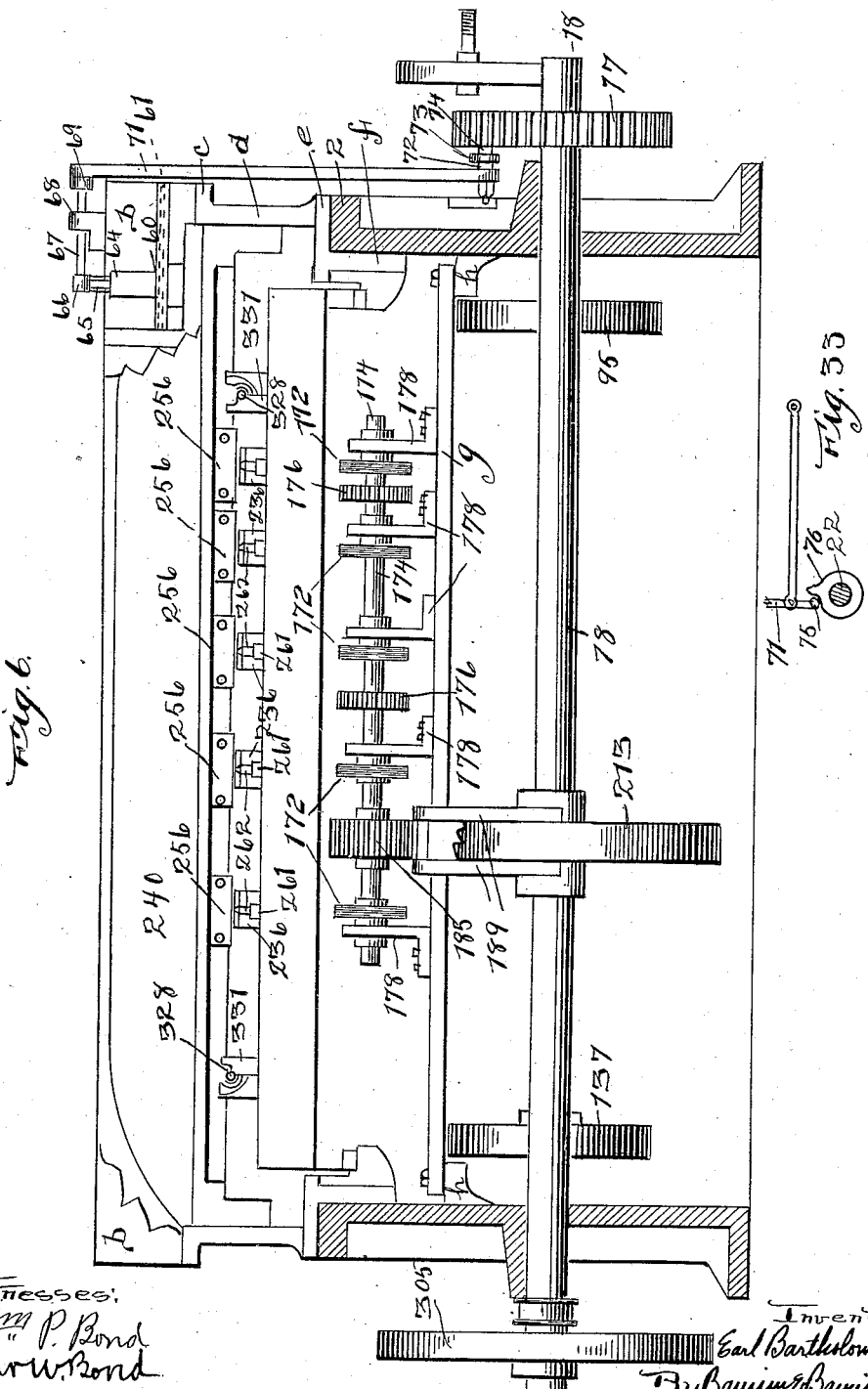

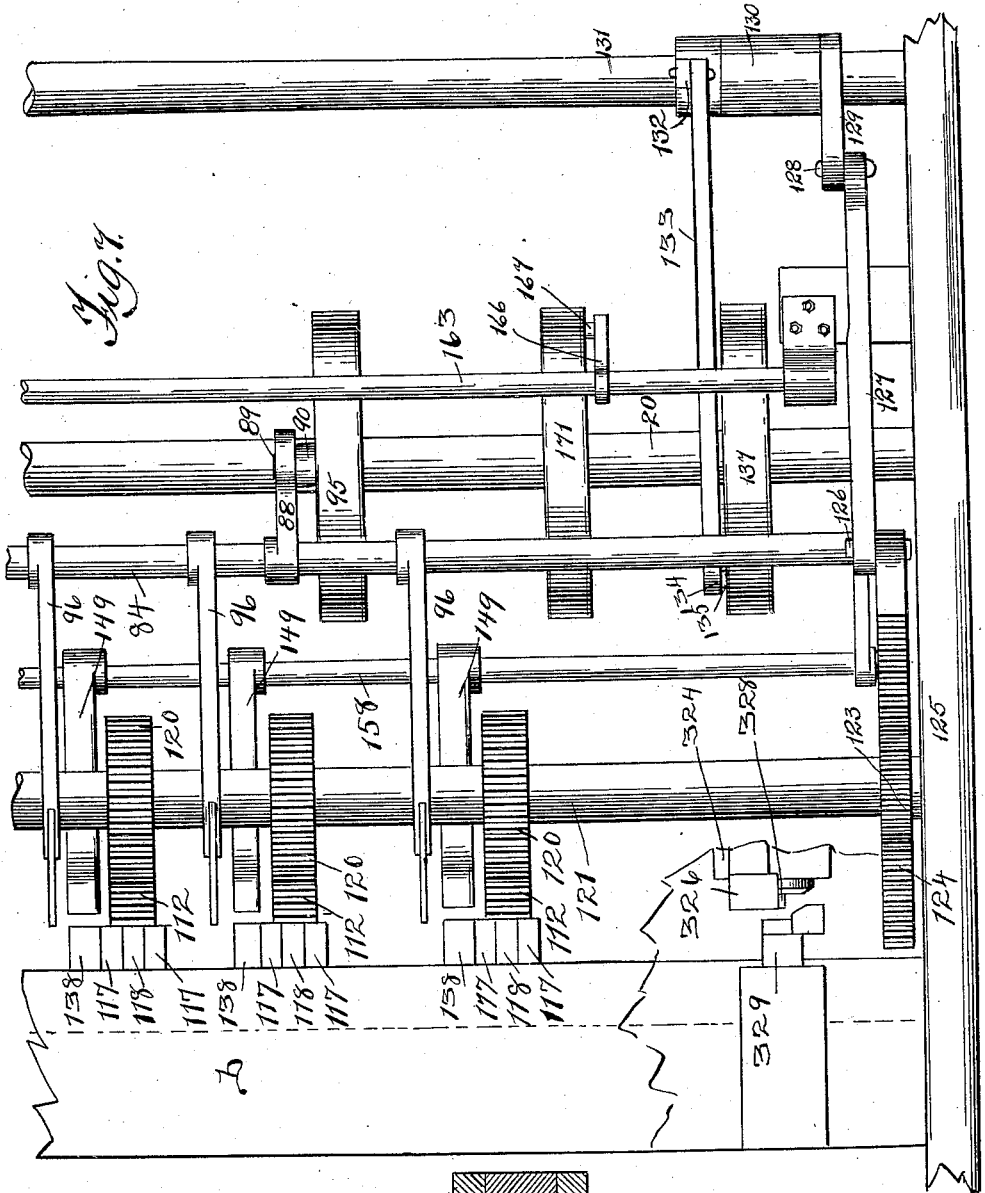

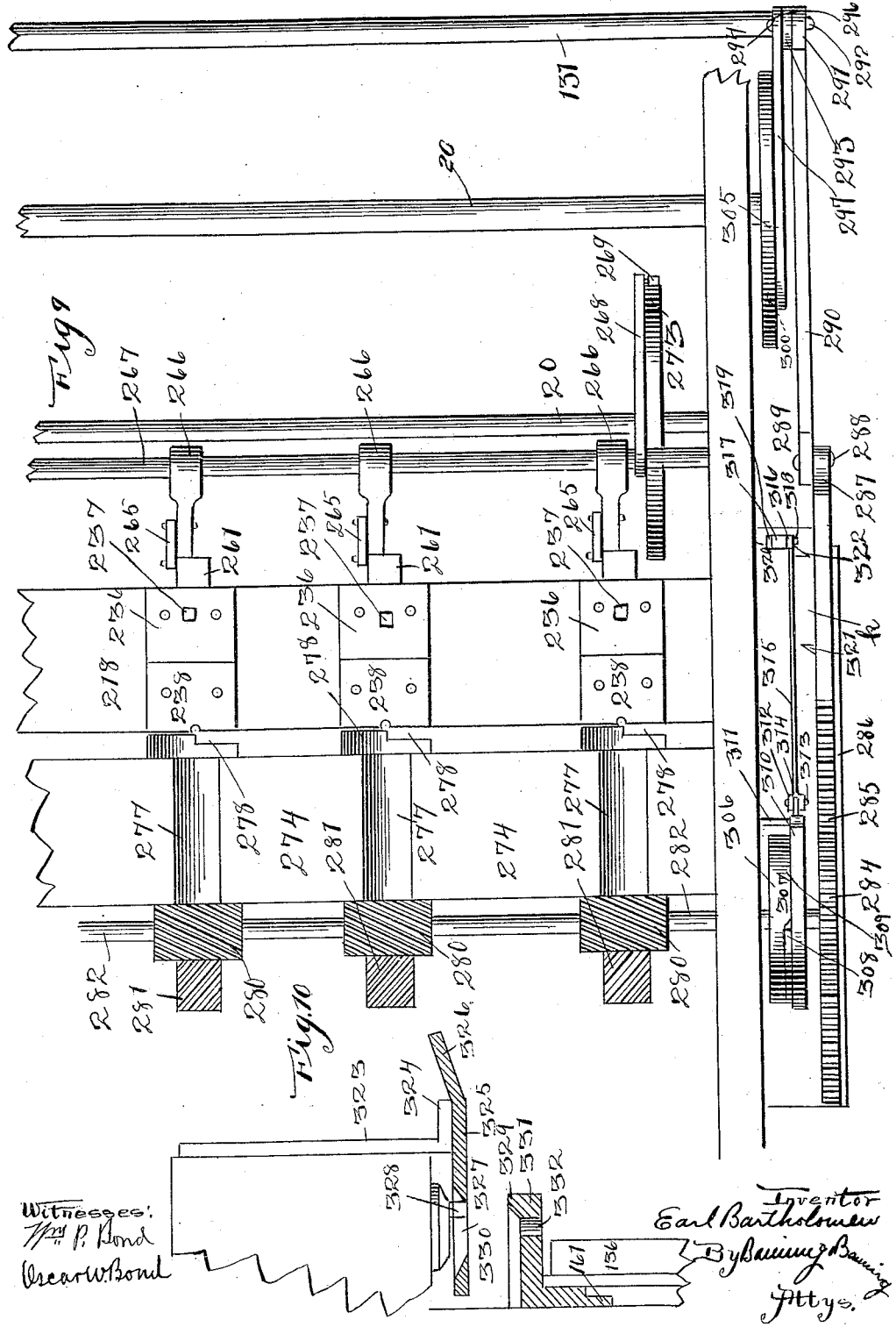

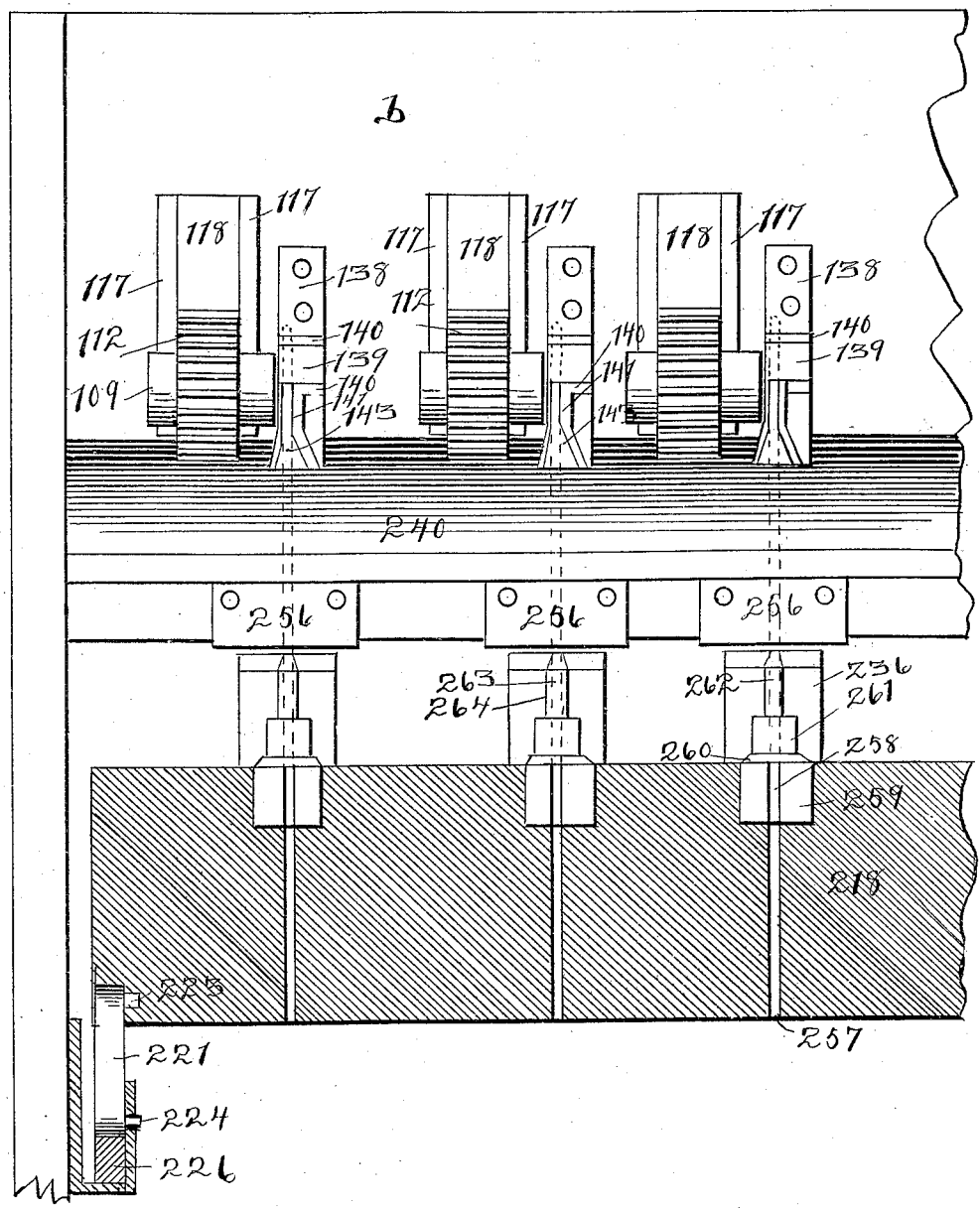

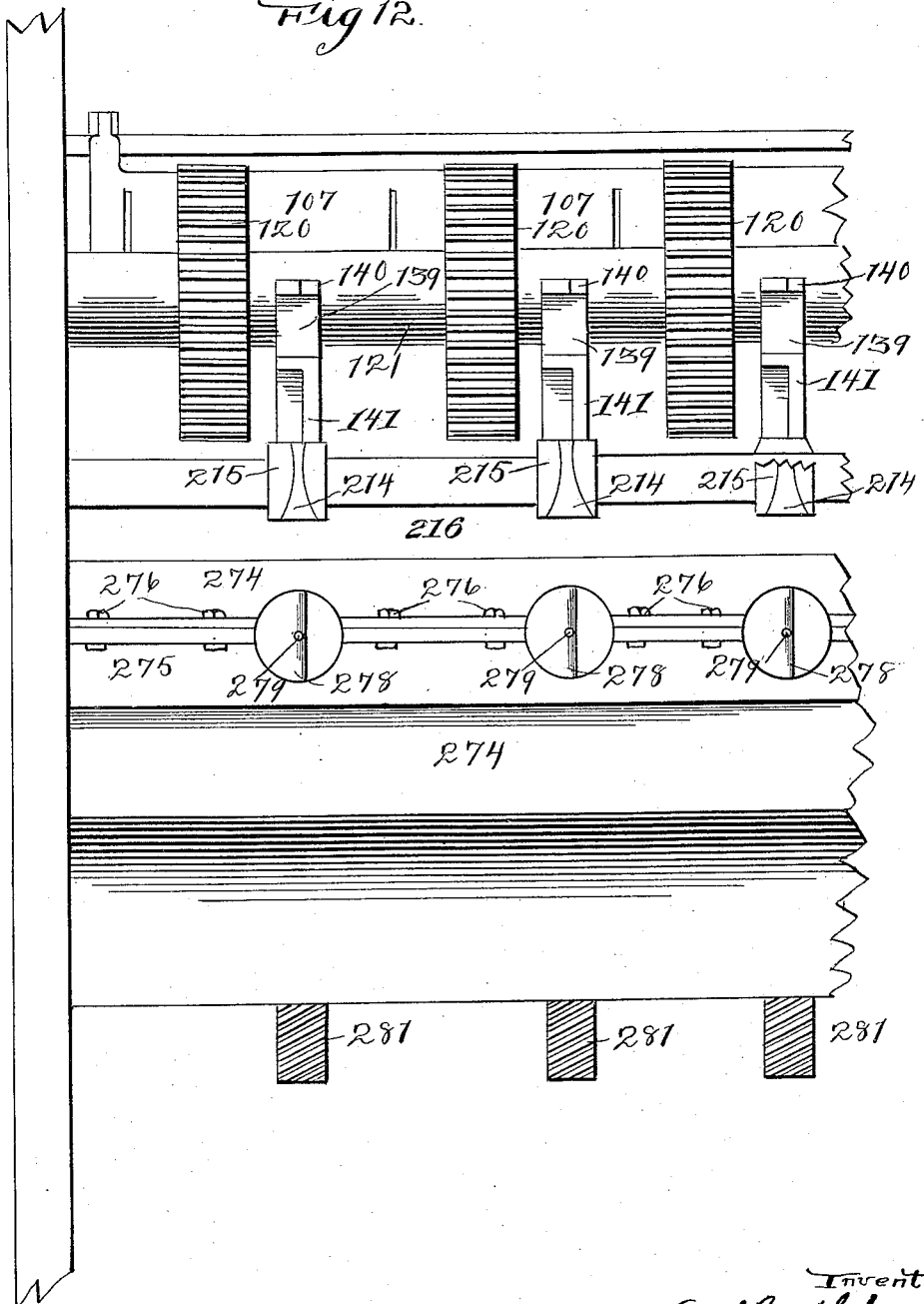

E. BARTHOLOMEW.
MACHINE FOR MAKING WIRE FENCE.
APPLICATION FILED OCT. 10, 1905.

966,156.

Patented Aug. 2, 1910.

18 SHEETS—SHEET 11.

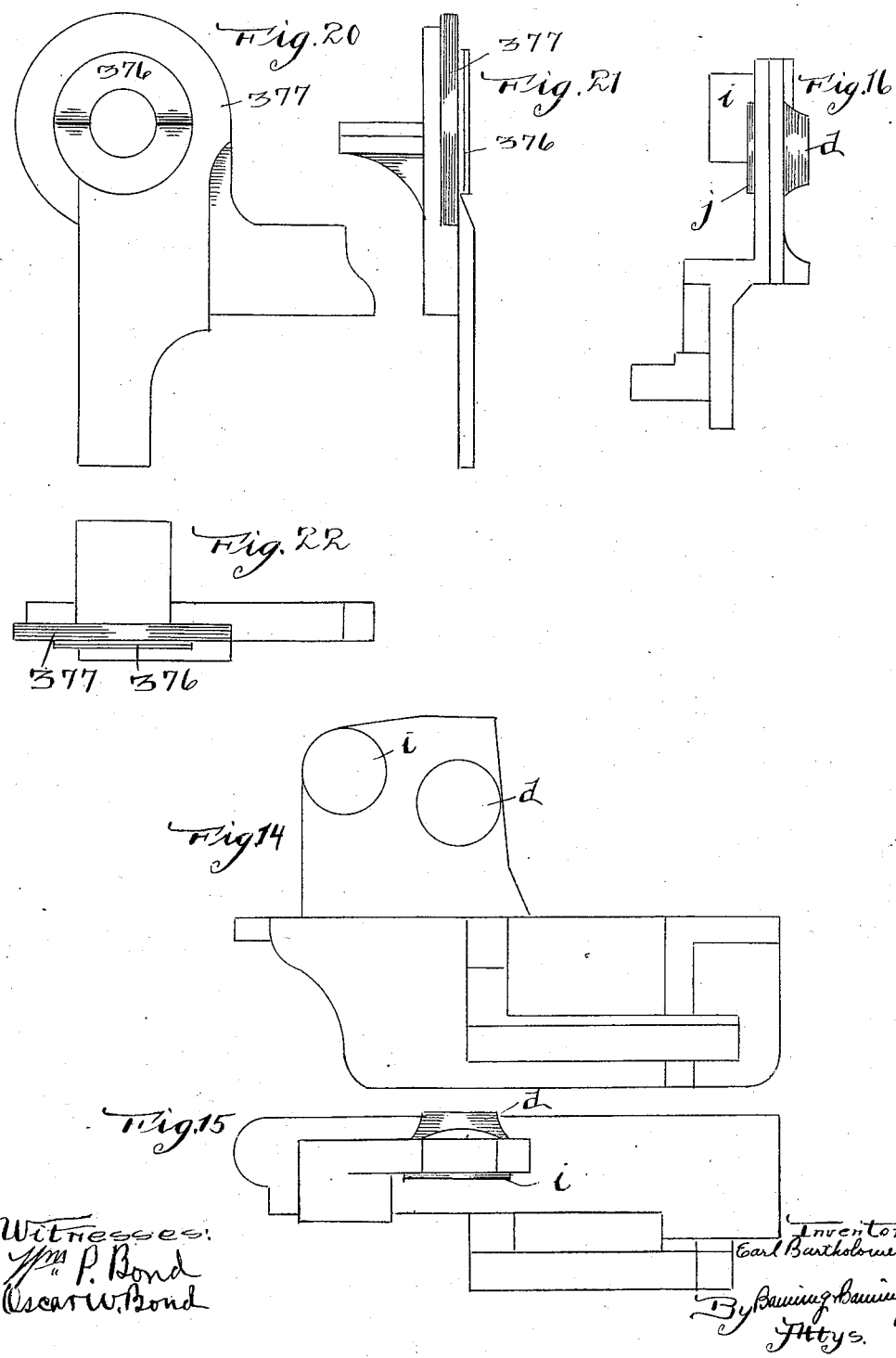

E. BARTHOLOMEW.
MACHINE FOR MAKING WIRE FENCE.
APPLICATION FILED OCT. 10, 1905.
966,156.
Patented Aug. 2, 1910.
18 SHEETS—SHEET 13.
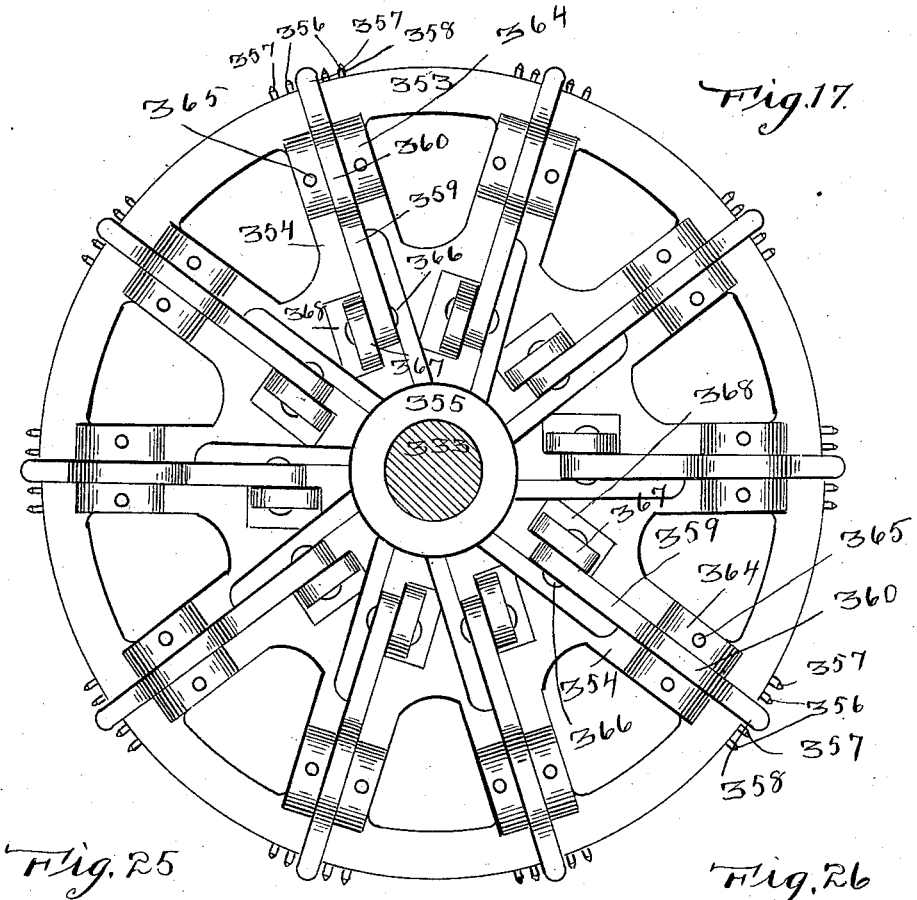
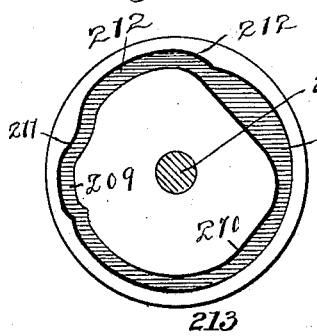
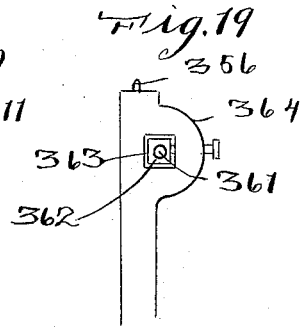
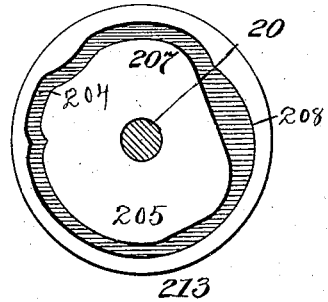
Witnesses:
Wm P. Bond
Oscar W. Bond
Inventor
Earl Bartholomew
By Banning & Banning
Attys.

E. BARTHOLOMEW.
MACHINE FOR MAKING WIRE FENCE.
APPLICATION FILED OCT. 10, 1905.
966,156.
Patented Aug. 2, 1910.
18 SHEETS—SHEET 14.
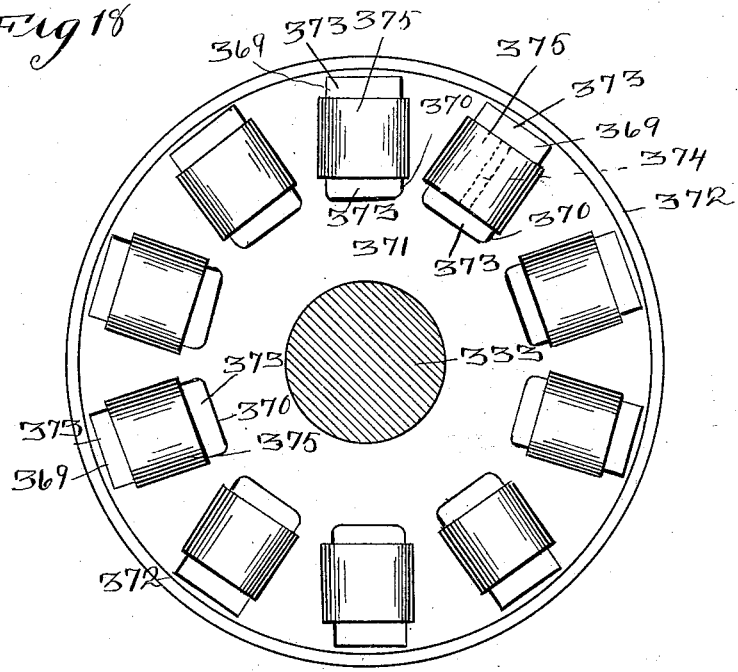
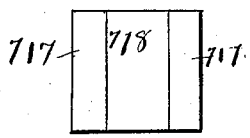
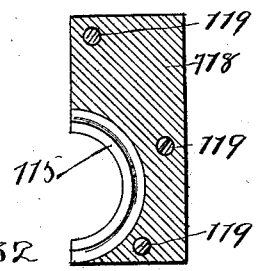
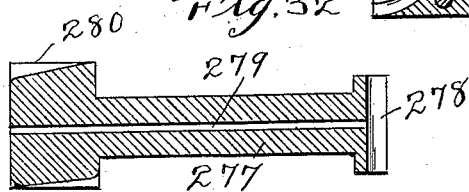
Witnesses:
Wm P. Bond
Oscar W. Bond
Inventor:
Earl Bartholomew
By Banning & Banning
Attys.

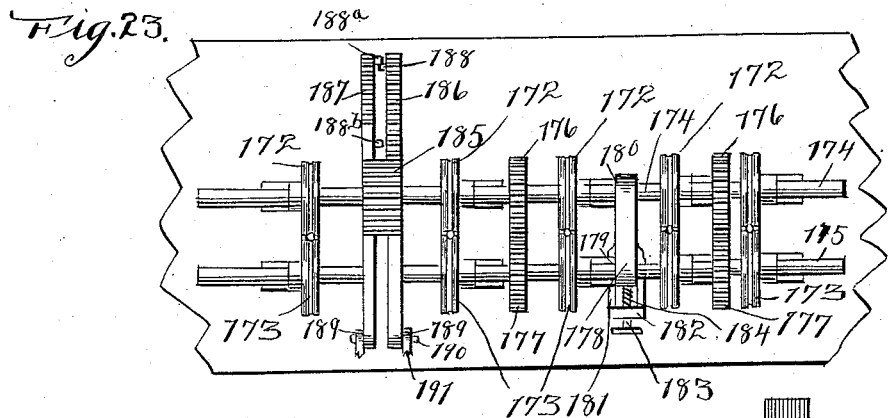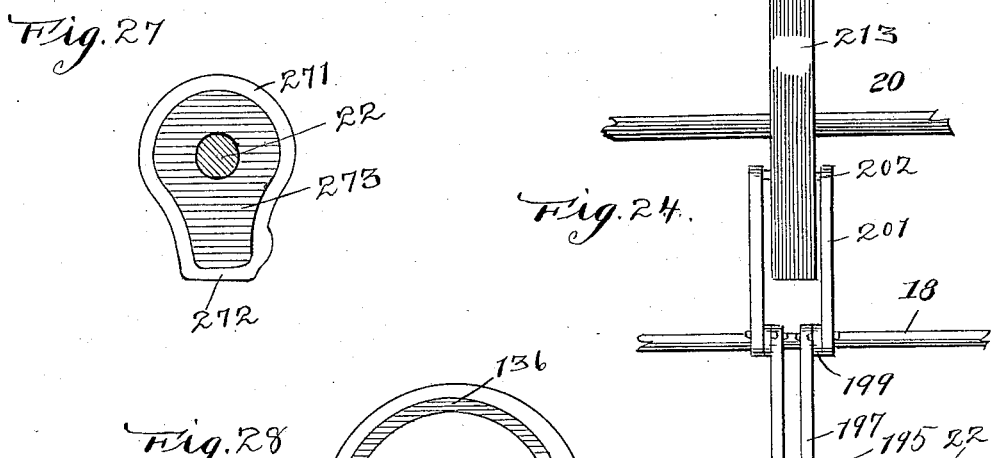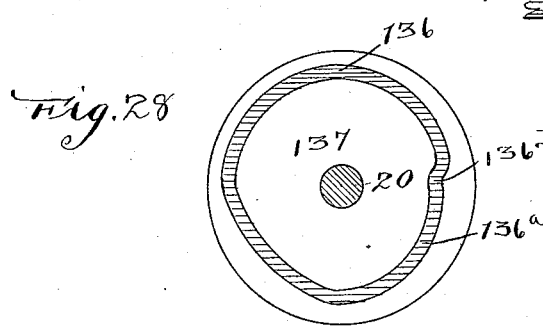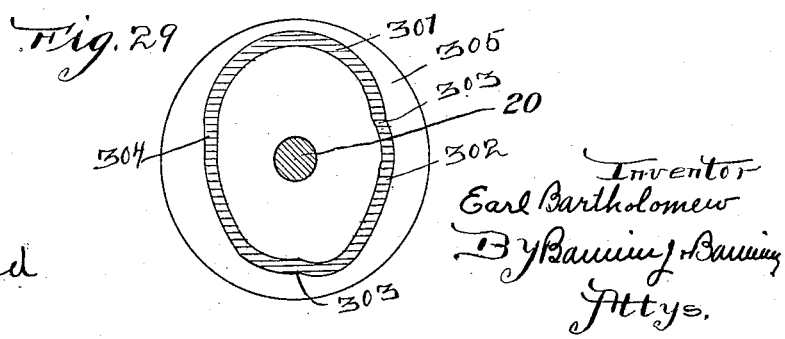

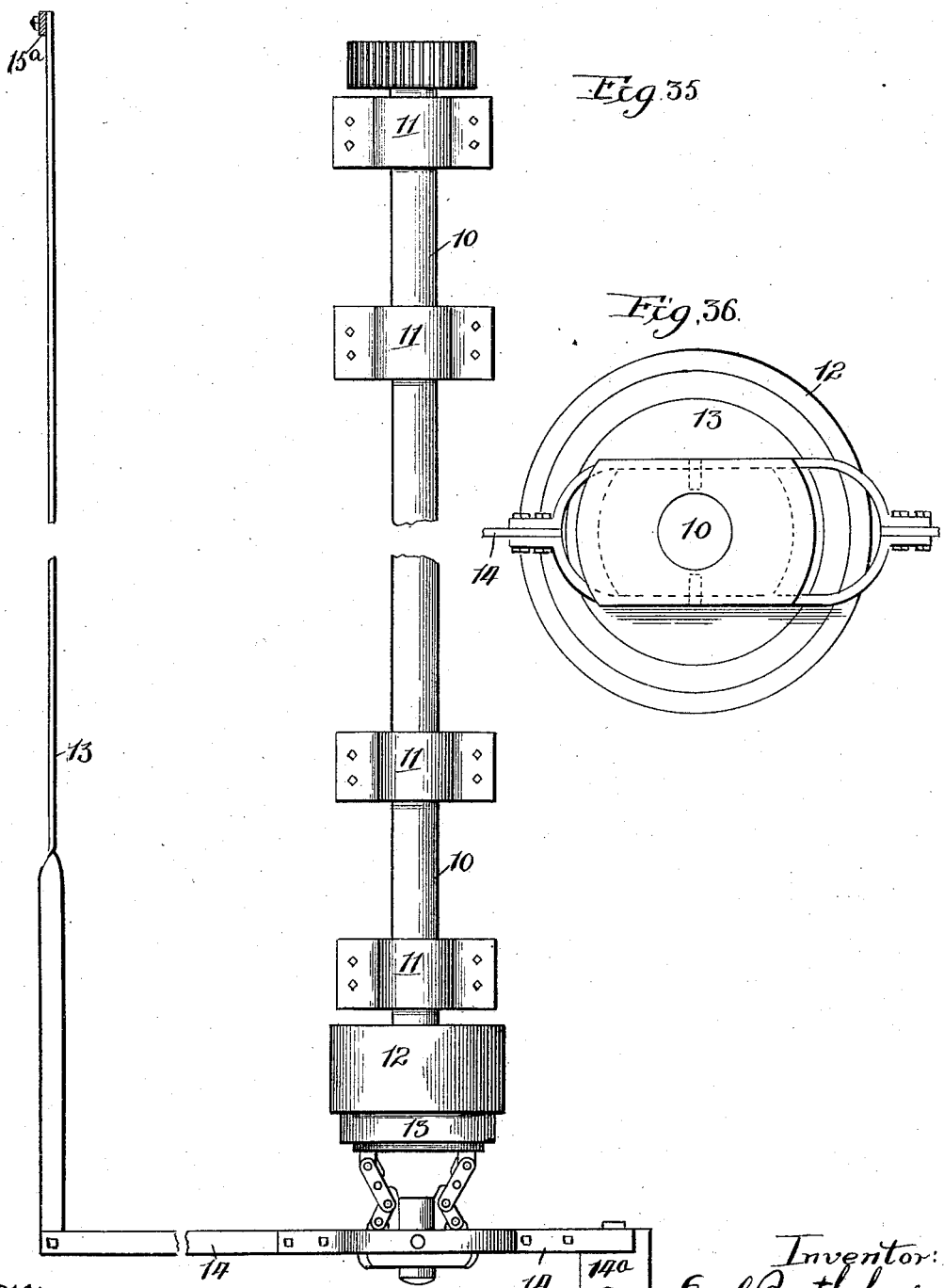

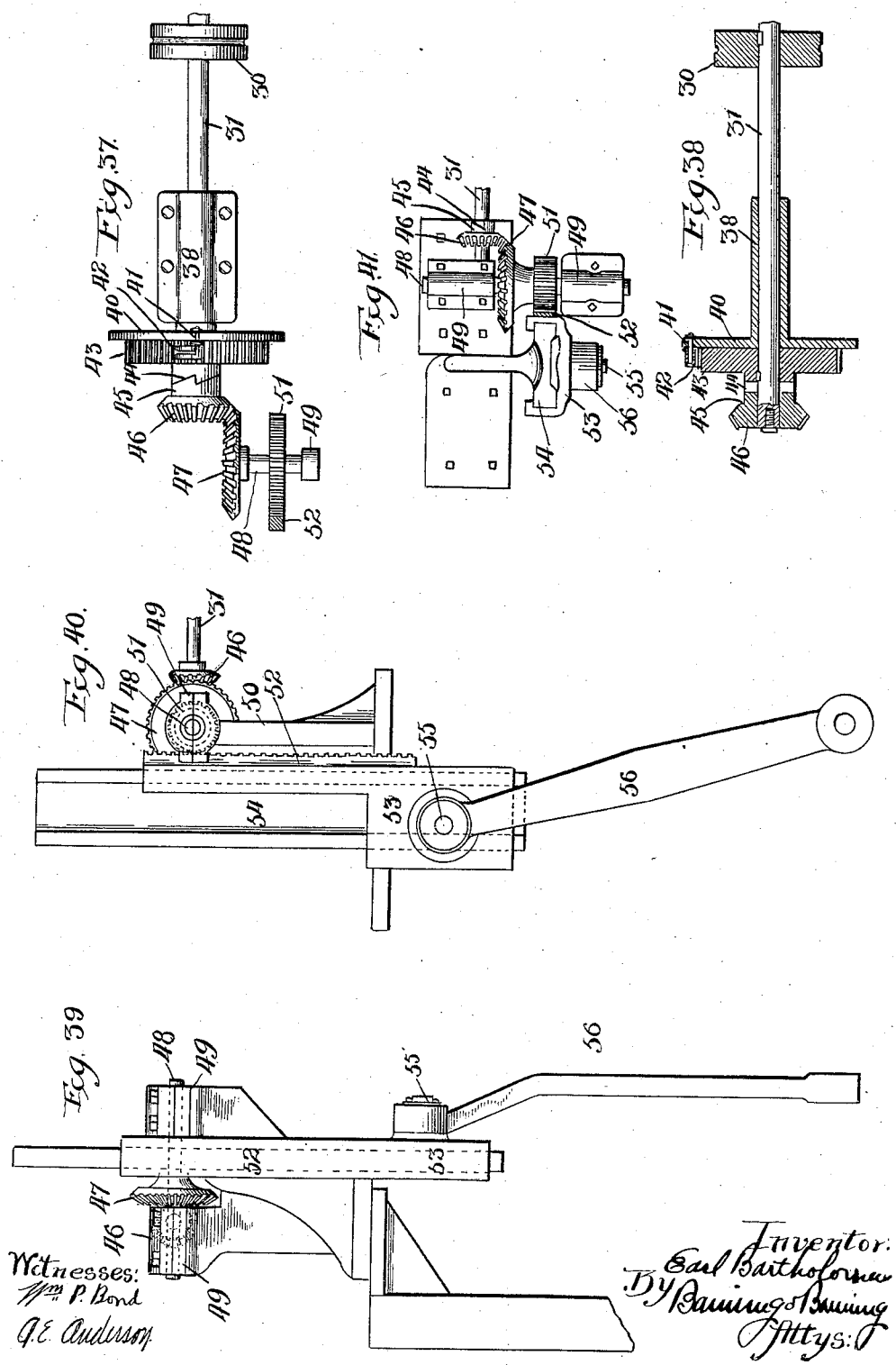

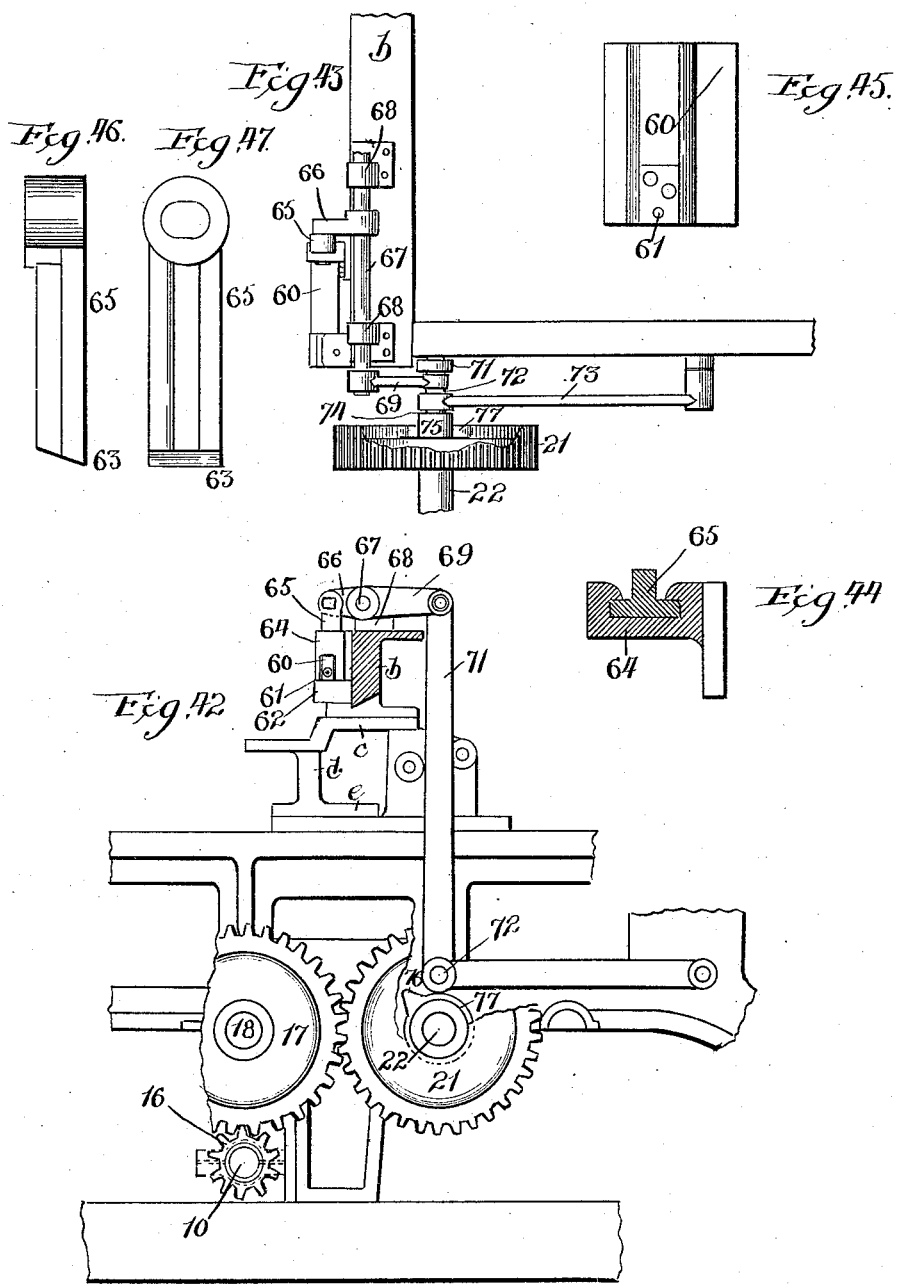

UNITED STATES PATENT OFFICE.

EARL BARTHOLOMEW, OF WAUKEGAN, ILLINOIS.

MACHINE FOR MAKING WIRE FENCE.

966,156.  Specification of Letters Patent.  Patented Aug. 2, 1910.

Application filed October 10, 1905. Serial No. 282,197.

*To all whom it may concern:*

Be it known that I, EARL BARTHOLOMEW, a citizen of the United States, residing at Waukegan, in the county of Lake and State of Illinois, have invented certain new and useful Improvements in Machines for Making Wire Fence, of which the following is a specification.

This invention relates to that type or class of machines for making what is known as a square mesh fence, that is a fence having longitudinal or strand wires and vertical stay wires or pickets, and to the particular form of such fence in which the stay wires or pickets are attached to the strand wires by means of a separate tie wire coiled around the stay wire or picket and the strand wire, thereby securing the stay wires or pickets to the strand wires.

The objects of the invention are to improve the mechanism by which the stay wires or pickets are advanced, severed to be of the proper length, and carried down to overlie the longitudinal wires; to feed or advance the tie wires into position for the upper or advance end to project above the stay or picket wire and in proper relation to a twister or coiler by which the upper or advance end will be coiled around the stay wire or picket; to drop the stay wire with the ends of the tie wires coiled thereon into position to overlie the longitudinal strand wires; to sever the tie wires after dropping the stay wires into position over the longitudinal or strand wires so as to furnish an end for each tie wire for winding or coiling around the horizontal strand wires; to furnish crimpers by means of which the stay wire or picket will be crimped or bent on each side of each longitudinal or strand wire; to furnish crimpers by means of which the longitudinal or strand wires will be crimped or bent on each side of the stay wires or pickets; to intermittently advance the stay wires or pickets into position, sever the advance portion of the body of the stay wire into a length to overlie the strand wires and force or carry the stay wires or pickets within a plurality of twisters or coilers by which the ends of the tie wires will be wound or coiled around the stay wire or picket; to intermittently advance and recede the tie wires and after the recession sever the tie wires to leave ends of proper length for winding around the longitudinal or strand wires; to intermittently advance the longitudinal or strand wires at proper intervals for spacing the stay wires or pickets thereon and coiling the ends of the tie wires around the longitudinal or strand wires completing the attachment of the stay wires or pickets to the longitudinal or strand wires; to furnish a mechanism for crimping the stay wires or pickets on each side of each longitudinal or strand wire, and a mechanism for crimping the longitudinal or strand wires on each side of each stay wire or picket; to furnish a mechanism for feeding, severing, and placing in position within coilers the stay wires or pickets, mechanism for advancing and receding the tie wires and severing the tie wires of a proper length for coiling or winding around the stay wires or pickets and the longitudinal or strand wires; a mechanism for crimping the stay wires or pickets, and mechanism for crimping the longitudinal or strand wires; and means for advancing intermittently the longitudinal or strand wires; and to improve generally the several mechanisms entering into the machine as a whole, and by which are performed the various operations of feeding, severing and placing in position the stay wires or pickets, advancing and receding and severing the tie wires, winding or coiling the tie wires around the stay wires or pickets and the longitudinal or strand wires, crimping the stay wires or pickets, crimping the longitudinal or strand wires and feeding the stay wires, the tie wires and the longitudinal or strand wires.

The invention consists in the features of construction and combinations of parts hereinafter described and claimed.

In the drawings Figure 1 is a top or plan view of the machine of the invention; Fig. 2 a side elevation of the machine; Fig. 3 a side elevation of the machine on the opposite side to that shown in Fig. 2; Fig. 4 a longitudinal sectional elevation of the machine taken on line 4—4 of Fig. 1; Fig. 4ª a detail, showing a face view of one of the cams; Fig. 5 a similar view taken on line 5—5 of Fig. 1; Fig. 6 a cross sectional elevation taken on line 6—6 of Fig. 1; Fig. 7 a plan view taken on line 7—7 of Fig. 4; Fig. 8 a detail partly in section of one of the twisters or coilers for winding or coiling the ends of the tie wires around the stay wires or pickets; Fig. 9 a plan view taken on line 9—9 of Fig. 4; Fig.

10 a detail partly in section showing a twister or coiler encircling the marginal longitudinal or strand wires and the pusher for bending the end of the picket or stay wire in position to be caught by the twister or coiler; Fig. 11 an elevation partly in section showing the upper twisters or coilers and the tie wires dotted; Fig. 12 a similar view to Fig. 11 taken in the opposite direction to Fig. 11; Fig. 13 an elevation partly in section enlarged showing the mechanism for feeding the tie wires, coiling the end of the tie wires around the stay wire or picket, and coiling the end of the tie wire around the longitudinal or strand wire, and showing also the cutting devices for the tie wires; Fig. 14 an elevation of the bracket carrying the lower and upper crimper jaws or members; Fig. 15 a top or plan view of the bracket of Fig. 14; Fig. 16 an end elevation of the bracket of Fig. 14; Fig. 17 a face view of one of the crimping drums showing the crimping arms and mechanism therefor; Fig. 18 a face view of the disk for the actuating bars of the crimping arms showing the rollers placed thereon contacting the cam surface; Fig. 19 a side elevation of one of the gears for securing the crimping bar in place; Fig. 20 a front view of the cam for operating the crimping bars and its support for securing to the side frame; Fig. 21 a side view of the same; Fig. 22 a plan view of the same; Fig. 23 a plan view of the lower feed wheels and mechanism for operating the same; Fig. 24 a plan view of the cam and connecting rods for operating the rack bars of the lower feed wheel mechanism; Fig. 25 a face view of the left side of the cam for operating the lower feed wheels; Fig. 26 a face view of the right side of the cam; Fig. 27 a cam for actuating the tie cutters; Fig. 28 a cam for operating the upper twister; Fig. 29 a cam for operating the lower twister; Fig. 30 a top view of the journal box of the upper twister; Fig. 31 a longitudinal sectional view of the same; Fig. 32 a longitudinal section of the lower coiler or twister; Fig. 33 a side view of the cam for operating the stay wire cutters; Fig. 34 a detail in elevation of the support and journal boxes for the shafts of the feed wheels for the stay or picket wire; Fig. 35 a plan view showing the driving shaft and the clutch therefor and the lever for operating the clutch, the driving shaft and clutch being broken out; Fig. 36 an end elevation of the parts shown in Fig. 35 with the lever arm of the clutch broken off; Fig. 37 a plan view of the gearing and the ratchet and pawl connection between the gearing and the shaft for driving one of the feed wheels of the stay or picket wire; Fig. 38 a longitudinal section of the parts shown in Fig. 37 with the shaft in full elevation, except at one end; Fig. 39 an edge elevation of the rack and the support therefor and the gearing for driving the shaft of the feed wheel of the picket wire; Fig. 40 a side elevation of the parts shown in Fig. 39; Fig. 41 a top or plan view of the parts shown in Fig. 39; Fig. 42 a side elevation of the fixed and movable cutter and the operating means for the movable cutters, the gear having the cam being broken out; Fig. 43 a top or plan view of the parts shown in Fig. 42 with the cam gear broken out; Fig. 44 a cross section of the movable cutter and its support; Fig. 45 a face or end view of the fixed cutter; Fig. 46 an edge view of the movable cutter; Fig. 47 a side view of the movable cutter; Fig. 48 a plan view, showing a portion of a main or strand wire and a portion of a stay or cross wire, with the tie wire applied at the crossing of the main or strand wire and the stay or cross wire; and Fig. 49 a cross section of the parts shown in Fig. 48.

The machine in the construction shown has two companion side frames each consisting of a lower rail 1, an upper rail 2 and an intermediate rail 3 with the rails at one end joined together by a standard or upright 4, and joined together at the other end by a standard or upright 5; and, as shown, an intermediate standard or post 6 connects the lower rail and the intermediate rail 3 and a series of standards or uprights the upper rail and the intermediate rail 3; but the form of the side frames can be changed so long as the side frames furnish a support for the mechanisms of the machine. The side frames at one end are connected together by a cross bar 8 of angle iron formation, and at the opposite end are connected together by a cross girder or hollow beam 9 extending from side frame to side frame as does the cross bar 8; and both the cross bar 8 and the hollow girder or beam 9 are secured by bolts or otherwise at their ends to the side frames.

A main driving shaft 10 is located in the arrangement shown just above the lower cross rails of the side frame and is supported in suitable journal boxes or brackets 11 projecting from the side frames. The main shaft at one end has a driving pulley 12 over which runs a driving belt, not shown, driven from any suitable source of power. The driving pulley has coöperating therewith a clutch 13 slidable on the shaft 10 and movable back and forth by a lever 14 one end of which is pivoted to a support 14ª extending out from the side frame, and the other end of which is pivoted to a bar 15 extending across the machine and pivotally connected with a lever 15ª mounted on a pin or pivot 15ᵇ on the side frame so that by moving the arm or lever 15ª the lever 14 can be swung so as to advance the clutch 13 into engagement with the driving pulley 12 or recede the clutch 13 and disengage the driving pulley. The driving pulley is loosely mounted on the shaft 10, and the clutch 13 is connected with the shaft by a spline or otherwise so as to be free to be advanced and receded to engage and disengage the driving pulley and revolve or stop the revolution of the main driving or power shaft 10 as may be required or necessary in operating the machine. The main driving or power shaft at the opposite end to the driving pulley 12 has fixed thereon a pinion 16 which meshes with a gear 17 fixed on a shaft 18 supported in suitable journal boxes on the side frames of the machine, and the gear 17 meshes with a gear 19 fixed on a shaft 20 also supported in suitable journal boxes on the side frames of the machine, and the gear 17 also meshes with a gear 21 fixed on a shaft 22 supported in suitable journal boxes on the side frames of the machine. It will be seen that from the driving pinion 16 power is imparted through the mesh gears 17, 19, 21 for revolving the shafts 18, 20, 22 when the main shaft 10 is driven.

A support or frame 23 composed of corner posts extending up from a base plate 24 (see Fig. 3) is attached by suitable bolts passing through the base plate to a shelf or table $a$ secured to the outer face of the top rail 2 of one of the side frames. The support or frame 23 has an opening 25 in which are located the feed wheels for the stay or picket forming wire. The under feed wheel 26 has a circumferential groove for the wire and is mounted on a shaft 27 supported in suitable journal boxes 28 located in slots 29 transversely of the opening 25 in the frame or support. The upper feed wheel 30 has a circumferential groove for the stay wire and is mounted on a shaft 31 supported in suitable journal boxes 32 also located in the slot 29, and these journal boxes are adjustable through a threaded stem 33 having a hand wheel 34 and operating in a top plate 35 bolted to the ends of the posts of the support or framing. The shaft 31 is the driving shaft and has fixed thereon a pinion 36 which meshes with a pinion 37 on the shaft 27 so that the feed wheels 26 and 30 are actuated from a common driving shaft.

The shaft 31 is supported and has its bearing in a long journal box or sleeve 38 supported on a standard 39 bolted or otherwise secured to the table or shelf $a$; and to the end of the journal box or sleeve 38 is secured a base or support 40 projecting out from which is a pin 41 on which is pivotally mounted a dog or pawl 42 the acting end of which engages with the teeth of a ratchet wheel 43 constituting one member of a clutch the other section or member 44 of which is on a hub or sleeve 45 loosely mounted on the end of the shaft 31 and carries a bevel pinion 46 which meshes with a bevel pinion 47 fixed on a shaft 48 mounted in a journal box or bearing 49 on the end of a support or standard 50 attached to the table $a$ or the top rail 2 of the side frame. The shaft 48 has fixed thereon a pinion 51 in mesh with a rack 52, which rack has a reciprocating movement given thereto. The rack at its lower end has a slide 53 movable on a guide bar 54 extending up from the top rail of the frame; and connected to the slide 53 of the rack bar 52 by a pin or pivot 55 is an arm or link 56 the lower end of which carries a pin 57 entered into a slot 58 in a crank or arm 59 fixedly attached to the end of the shaft 20, so that as the shaft 20 revolves it will carry around the crank or arm 59 and through the link or arm 56 reciprocate the rack bar 52 and revolve and through the pinion 51 give the shaft 48 a revolution first in one direction and then in the other by which the gear pinions 46 and 47 will be revolved likewise for the forward revolution through the clutch of the ratchet wheel or disk 43 to revolve the shaft 31, causing the feed wheels 26 and 30 to revolve and feed forward or advance the stay wire, while with the return revolution of the pinions 46 and 47 the ratchet and pawl connection allows the return movement of the rack to be nonoperative on the feed wheels, thus giving the feed wheels an intermittent rotation producing an intermittent feed for the stay or picket wire.

A fixed cutter 60 having a groove 61 for the passage of the stay wire is attached by a support 62 to the top rail 2 of the side frame or otherwise secured in position for the fixed cutter to lie in advance of the feed wheels and at the proper distance in relation to the strand wires for severing the required length of stay wire or picket. A movable cutter 63 is supported in a guide 64 and has its stem 65 pivotally connected with the end of an arm 66 the other end of which arm is fixedly secured to a rock shaft 67 mounted in a journal box or bearing 68 secured to a cross beam or girder $b$ to the side face of which is attached a guide 64 for the movable cutter. The cross beam or girder $b$ is mounted on a flange $c$ on the upper end of a standard or post $d$ attached by a plate or flange $e$ to the top rail of the side frame, and depending from the plate or flange $e$ is a vertical plate or flange $f$ which lies adjacent to the inner face of the side frame as shown in Fig. 6. These parts $c$, $d$, $e$, $f$ constitute a bracket or hanger, and a bracket or hanger is provided for each side of the machine supported as just described on the top rail of the machine. The other end of the rock shaft 67 has fixed thereto an arm 69 to the outer end of which is pivotally connected the upper end of a link or arm 71 projecting out from the lower end of which is a pin 72 having mounted thereon an arm 73 with a pivot or pin 74 at its end on which is mounted a roller 75 which rides on a cam 76 projecting out from an annular wall 77 formed around on the hub of the gear wheel 21 fixed on the shaft 22 so as to revolve the shaft as before described. The cam 76 and the annular wall or rim 77 form a trackway by which, as the cam engages the roller 75 with the revolving of the gear wheel 21 the arm or link 71 will be raised and lowered, and through the arm 69 rock the shaft 67 and vertically reciprocate the movable cutter 63 for the descent of the cutter to coöperate with the fixed cutter and sever the section for the stay wire or picket from the main wire. The main wire for the stay wire or picket runs from a spool not shown and passes between straightening rollers or wheels 78 and 79 and between an upper straightening wheel 80 and lower straightening wheels 81 and 82 to enter between the feed wheels 26 and 30; and the straightening wheels are mounted on a support or arm 83 extending out from and secured to the side frame as shown in Fig. 1. The straightening wheels deliver the stay wire to the feed wheels so that when advanced to overlie the strand wires each stay wire or picket will be approximately straight and not bowed as would be the case if the straightening wheels were not used.

A cross rod or tongue 84 is mounted in journal boxes 85 so that it can be rocked, and the journal boxes or bearings 85 are on the upper end of standards 86 attached at their lower ends to a cross plate or bar 87 secured at its ends to the side frames of the machine, a support being provided for each side of the machine. The rock shaft has fixedly attached thereto between the journal boxes or bearings an arm 88 having at its outer end a pivot 89 entering into the upper end of a link or arm 90 projecting out from which is a pin or stud 91 on which is a roller which enters a cam groove having a circular portion 93 and an inclined portion 94 and formed in a cam or disk 95 fixedly secured to the shaft 20 for the cam or disk 95 to revolve with the shaft. The lower end of the arm or link 90 has a slot 90$^a$ within which are guide rods 90$^b$ which enter grooves formed in the ends of a box 90$^c$ mounted on the shaft 20 so that the lower end of the arm or link 90 is held in a fixed relation and through the slot 90$^a$ is given a vertical movement and properly guided in its reciprocating movement to operate the arm 88 and rock the shaft 84 in its journal boxes or bearings.

The rock shaft 84 has fixedly secured thereto a plurality of fingers 96 and to the end of each finger 96 is attached a head 97 in the end face of which is a semi-circular recess or groove 98 of a form to engage the stay wire or picket. The semi-circular recess or groove 98 coöperates with a semi-circular groove or recess 99 into which the stay wire or picket is delivered by the feed wheels so as to be held in position above the upper series of twisters or coilers for the tie wires. The semi-circular groove or recess 99 is formed in each one of a plurality of fingers 100 depending from a cross bar 101 which extends across the machine and is supported at its ends by a plate or flange 102 bolted thereto and forming a part of a neck or pendant 103 having a bearing 104 journaled or mounted on a cross rod 105 supported in arms or brackets 106 attached to a support or standard 107, and the supports 107 are secured to the cross bar or girder $b$ attached at its ends to the supporting brackets on the side frames of the machine as already described. A coil spring 108 encircles the rod 104 adjacent to each neck or pendant 103 for one end of the coil spring to bear against the cross bar 101 and the other end to bear against the top of the post or support 107 so that the coil spring will act and hold the fingers 100 normally in their advanced position for retaining the stay wire or picket in the groove or recess 99 until removed. It will thus be seen that each stay wire or picket as it is severed from the main stay wire by the action of the fixed and movable cutters is supported temporarily by the semi-circular groove or recess 99 in the fingers 100 and is engaged by the semi-circular groove or recess 98 in the heads 97 of the fingers 96 and carried down with the descent of the fingers 96 and delivered into position for the twisting or winding therearound of the ends of the tie wires, and with the descent of the fingers 96 to remove the stay wire or picket from the fingers 100 the fingers 100 swing away from the stay wire or picket by the descending movement of the stay wire or picket as it leaves the retaining groove or recess, and with the removal of the stay wire or picket from the retaining fingers 100 the fingers are returned by the coil spring 108 to their normal position for the reception in their grooves or recesses 99 of the next succeeding stay wire or picket which is held up by the fingers 100 until the succeeding descent of the fingers 96, and these operations will continue so long as a stay wire or picket is delivered to the retaining fingers 100 for removal therefrom by the delivery fingers 96 to be positioned in proper relation for the winding thereon of the tie wires.

A plurality of twister or coiler heads 109 each having at its acting end a lip 110 and a longitudinal slot 111 are located in a position crosswise of the machine so as to receive into the longitudinal slots of the several twister or coiler heads the stay wire or picket as it is carried down by the action of the delivery fingers 96 so that the stay wire or picket will lie crosswise of the machine and be supported in position by the plurality of coiler or twister heads. Each coiler or twister head has fixed thereon or formed therewith a pinion 112 in which is a slot 113 in line with the slot 111 of the twister or coiler head as shown in Fig. 8. Each coiler or twister head and its pinion is mounted in a journal box or bearing. The mounting as shown is by means of an annular groove 114 formed in each face of the pinion into which is entered a flange or rim 115 on the half box 116 forming the journal box or bearing on a support or bar 117 attached to the cross girder $b$ by a block 118 to which the plates or supports 117 are secured, and bolts 119 passing through the depending flange of the cross girder $b$ and into the head or block 118, two plates or bars 117 being used one on each side of the pinion.

Each pinion 112 has meshing therewith a pinion 120 on a cross shaft 121 mounted in suitable journal boxes at its ends on posts or standards 122 extending up from the top rail 2 of each side frame. The shaft 121 at one end thereof adjacent to the inner face of the side frame has fixed thereon a pinion 123 in mesh with which is a reciprocating rack 124 supported in a guide 125 so as to be free to advance and recede. One end of the rack is connected by a pin or pivot 126 with the end of an arm or link 127 the other end of which is connected by a pin or pivot 128 with an arm 129 on a sleeve 130 loosely mounted on a fixed shaft 131, and the sleeve 130 has extending up therefrom an arm 132 attached to which is one end of a link or arm 133 the other end of which has a stud or pivot 134 on which is a roller 135 entered into a cam groove consisting of a concentric section or portion 136, an eccentric section or portion 136$^a$ and a depressed section or portion 136$^b$ formed in the face of a cam or disk 137 fixed on the shaft 20, which cam groove with its concentric, eccentric and depressed sections or portions is of a nature to move the link or arm 133, as the cam groove is carried around with the revolving of the cam or disk 137 by which the sleeve 130 is locked on the fixed shaft 131 and through the arm 129, a link or arm 127 reciprocates the rack 124 to oscillate the pinion 123 on the shaft 121 by which the pinions 120 will be given a forward and reverse rotation, imparting a corresponding rotation to the pinions 112 by which the twisters or coilers will be given a forward and reverse rotation for winding or coiling the end of the tie wire around the stay wire held in the slots of the twister or coiler heads. The travel of the rack 124 should be sufficient to wind or coil the end of each tie wire around the stay wire or picket at least two full coils, and during the travel of the roller 135 in the concentric section 136 of the cam groove the rack bar 124 is stationary, and the twister or coiler heads and their pinions are in position for the slots therein to stand vertical so as to receive thereinto the stay wire or picket as it is carried down by the action of the depressed fingers, and with the stay wire or picket fully entered in position, and as the roller enters the eccentric bar of the cam groove the track bar is advanced to revolve the shaft 121 and through the pinions 120 and 112 rotate the coiler or twister head in a direction to wind or coil the end of the tie wire around the stay wire or picket with a cessation of the advance at a point for the slots 111 and 113 to stand vertically downward, permitting the withdrawal of the stay wire or picket with the end of the tie wires wound thereon out from the coiler or twister heads and into position to complete the knotting of the tie wires around the strand wires. The continued rotation of the cam or disk 137 causes the eccentric portion of the cam groove to act and return the rack 124, giving a reverse rotation to the shaft 121, and through the pinions 120 and 112 reversing the rotation of the coiler or twister head and bringing the coiler or twister heads into position for the slots therein to stand vertically upward as the rotation of the cam or disk 137 brings the concentric part of the cam groove into position to receive thereinto the roller.

Adjacent to the acting end of each coiler or twister head is an L-shaped block 138 bolted or otherwise secured to the depending flange of the cross girder $b$, and the bottom portion of the L shaped block has therein an opening 139 located between an upper and lower ledge or jaw 140, and depending or projecting below the lower ledge or jaw 140 is a web or a neck 141 terminating in a spread head 142 having therein a V shaped groove or recess 143 into which the end of the tie wire enters as the tie wire is advanced or elevated for the advance end or portion of the tie wire to pass in front of the recess 139 and the jaws 140 with a sufficient projection above the upper jaw 140 for the end of the tie wire to be of sufficient length to furnish the wind or coil of the tie wire around the stay wire or picket. This L shaped block or head 138 with its recess or depression and its jaws 140 form the fixed section or division of a clamp for holding the tie wire in position while the end thereof is being wound or coiled around the stay wire or picket. The other section or division of the clamp is formed to have an acting end with an upper and lower slot 144 to receive the flanges or jaws 140, and an intermediate finger or jaw 145 to enter the recess 139, and an upper finger or jaw 146 to pass over the upper jaw or flange 140, and a lower finger or jaw to pass below the lower flange or jaw 140 when the movable division or section of the clamp is advanced. The lower jaw, as shown, has a beveled upper corner 147, and the slots 144 and fingers or jaws 145, 146 and 148 are formed on the end of a head 149 of a bar 150 the end of which is secured to a cross bar or plate 151 extending across the machine so that the several movable members or divisions of the clamps will be moved in unison it being understood that a clamp consisting of a fixed section or member and a movable section or member is provided for each tie wire and located adjacent to each coiler or twister head for the tie wires. The cross bar or plate 151 has its ends entered into a slot 152 of a guide bar 153 so as to insure a straight line movement for the movable sections or members of the clamps. The guide bar 153 is supported at one end on the cross support for the coiler or twister heads encircling the strand wires, and its other end is attached to a post 154 having a base 155 bolted or otherwise secured to the top rail 2 of each side frame, a guide bar 153 being provided for each side of the machine. An ear 156 is secured to each end of the cross plate or bar 151, and each ear has an eye 157 receiving a pivot 158 on a link or arm 159, the other end of which has a pin or pivot 160 entered into a slot 161 in an arm 162 fixedly attached to a rock shaft 163 mounted in a journal box or bearing 164 on a plate 165 bolted or otherwise secured to the under side of the cross piece 8, as shown in Fig. 5. The rock shaft 163 has depending therefrom an arm 166 projecting out from which is a stud or pin 167 on which is a roller which enters a cam groove consisting of a concentric portion 168 with a projecting portion 169 and a concentric portion 170 and formed in a cam or disk 171 fixedly attached to the shaft 20 so as to revolve with the shaft. The groove of the cam or disk 171 as the cam or disk is revolved operates while the concentric portion or section 168 thereof is engaged with the roller to hold the movable section of the clamp in its advanced or receded position according as to what portion of the section 168 of the cam groove engages the roller, and with the engagement of the projected portions 169 of the cam groove with the roller the jaw or movable member of the clamp is avanced and receded, and during the time that the concentric portion 170 of the groove is engaged with the roller 167 the movable jaw or member of the clamp is held in its advance position to coact with the fixed jaw or member of the clamp and hold the tie wire firmly in place while the end thereof is wound or coiled around the stay wire or picket.

The tie wires are each advanced or fed forward between feed wheels 172 and 173, as many feed wheels being provided as there are tie wires. The feed wheels 172 are mounted on a driven shaft 174 and the feed wheels 173 are mounted on a driven shaft 175 the two shafts extending across the machine and each being mounted in suitable journal boxes or bearings. The shaft 174 has fixed thereon pinions 176 which mesh with pinions 177 on the shaft 175 so that with the revolving of the shaft 174 the shaft 175 is correspondingly revolved through the pinions 176 and 177. The journal boxes or bearings for the shafts 174 and 175 are located in frames or supports 178 attached at their lower ends to a cross plate $g$ extending across and secured at its ends to lugs or brackets $h$ on the inner face of each side frame. Each standard or support 178 carries a journal box 179 for the shaft 175 and a journal box 180 for the shaft 174, with the journal box 180 adjustably mounted in the standard or support, and attached to the movable journal box 180 are the arms 181 of a stirrup the end bar 182 of which has entered thereinto a threaded stem 183 around which is a coiled spring 184 by means of which the proper pressure can be given to the feed wheels for correctly advancing or feeding forward the tie wires. The shafts are revolved in opposite directions by means of a pinion 185 fixed on the shaft 174 and racks 186 and 187 which engage with the pinion. The rack 186 has cogs its full length while the rack 187 has cogs for only a portion of its length, and, as shown, the rack 186 has a stop 188 and the rack 187 has stops 188$^a$ and 188$^b$ (see Fig. 23) by means of which stops one of the racks has a movement independent of the other for a distance equal to the space between the stops 188$^a$ and 188$^b$ on the rack bar 187 for a purpose hereafter stated. Each rack bar 186 and 187 at its attached end has an ear 189 from which projects a pivot 190 entered into the end of a link 191 the other end of each link receiving a pivot 192 projecting out from an arm 193 fixedly mounted on a rock shaft 194 suitably supported in journal boxes or bearings. A pair of depending arms 195 are fixedly attached to the rock shaft 194 adjacent to the arms 193, and each arm 195 at its outer end has a pin or pivot 196 to which is attached the end of an arm or link 197, the other end of which has a pin or pivot 198 attached to an arm 199 of a vibrating lever mounted by means of a sleeve or bearing 200 on the shaft 18 with the other arm 201 of the lever extending in an inclined direction and having at its end a stud or pivot 202 on which is a roller 203 which enters a cam groove having a concentric portion 204, an eccentric portion 205, a straight portion 206 and a portion 207 with a depression 208 centrally thereof. This construction applies for the connection of the rack 186 with the operating cam as regards the shape or configuration of the cam groove. The lever arm 201 has its roller 203 entered into a cam groove having a concentric portion 209, a concentric portion 210, and side portions 211 of similar shape and each having a depression 212 therein. This construction applies for the connection of the rack 187 with the operating cam as regards the shape or configuration of the cam groove.

The cam grooves for the respective racks 186 and 187 are formed in the opposite faces of a cam or disk 213 fixedly mounted on the shaft 20 so as to revolve with the shaft and in revolving through the cam grooves oscillate the levers 201 for reciprocating the rack bars 186 and 187 under different conditions as to reciprocation. The cam groove 204, 205, 206, 207 with the depression 208 when engaged with the roller 203 as the cam or disk 213 revolves reciprocates the rack bar to the limit of engagement of the cogs of the rack bar with the cogs of the pinion 185, giving the pinion a rotation in both a forward and a reverse direction for the full length of the rack bar 186 with a stoppage of the rack bar as the roller 203 is engaged by the concentric portion of the cam groove, and a movement of the rack bar 186 forward and backward as the roller is engaged by the eccentric portions of the cam groove. The cam groove 209, 210, 211 with the depression 212 when engaged with the roller 203 as the cam or disk 213 revolves reciprocates the rack bar to the limit of engagement of the cogs of the rack bar with the cogs of the pinion 185, giving the pinion a rotation in both a forward and a reverse direction for the full length of the rack bar 187 with a stoppage of the rack bar as the roller 203 is engaged by the concentric portion of the cam groove and a movement of the rack bar 186 forward and backward as the roller is engaged by the eccentric portions of the cam groove. The rack 187, however, is given a full throw by reason of the engagement of the stop 188 with the stops 188ᵃ and 188ᵇ in the construction shown, but these stops are not an actual necessity as the formation of the cam grooves for the respective rack bars 186, 187 is such as to cause the rack bar 186 to travel forward for the full length of its cogs while the rack bar 187 remains inactive during the time the pinion 185 is over the vacant space of the rack bar. It will be seen that the movement of the rack bars 186 and 187 is such as to cause the rack bar 186 to be continuously operative while the rack bar 187 is operative for only a portion of a stroke. This enables the rack bars to revolve the feed wheels in a forward direction so as to advance the tie wires the necessary distance to project their forward ends the required length above the stay wire to present ends for coiling or winding around the stay wire, while on the reverse revolving of the feed wheels the rack bar 186 only is operative thereby giving a backward feed for the tie wires with the stay wire the distance necessary to cause the stay wire to overlie and rest on the strand wires with a projection below the strand wires for severance by a cutter as hereafter described, to furnish a coiling or wrapping end for the tie wire around the strand wires. The necessary increase of feed to advance the tie wires and the decrease of feed to return the tie wires and the stay wire into position is attained through the increased length of movement obtained and decreased length of movement derived from making one of the rack bars inoperative during a portion of the stroke for such rack bar to be brought into action and released from action at the proper time to furnish the required increase and decrease of stroke for the forward feed and return feed of the tie wires to bring the tie wires into proper position for winding or coiling the ends thereof around the strand wires.

The advance end of each tie wire, as the tie wire is fed forward, enters a groove or recess 214 in a guide head 215 on a bar 216 on the top of which is a cross plate 217 in the upper face of which is a plurality of grooves, one groove for each guide rib or tongue 150ᵃ on each arm or bar 150 carrying the movable section or jaw of the clamp for the tie wire while its end is being coiled around the stay wire or picket. This guide 215 insures the passage of the forward or leading end of each stay wire into the groove 143 of the guide 142, so that each tie wire will pass on the side of the stay wire or picket adjacent to the fixed jaw of the clamp so that with the advance of the movable member or jaw of the clamp the projected end of each stay wire will be turned slightly toward the movable member or jaw forming an initial bend for the wind or coil and bringing the end of each stay wire into position to be caught by the lip 110 of the twister or coiler head and with the rotation of the twister or coiler head in the advance direction wrap or coil the projected end of each tie wire around the stay wire or picket. The tie wires are all fed forward simultaneously and the movable member of each clamp is advanced simultaneously to tie and hold the tie wire firmly in place with its advance end turned as just described, and the series of coilers are simultaneously revolved to wind the ends of the tie wires around the stay wire with the limit of forward revolution stopped at a point to bring the slots in each coiler head and its pinion vertically downward for withdrawal of the stay wire with the ends of the tie wires wound thereon by the receding feed of the tie wires through the reverse rotation of the feed wheels thereon.

Each stay wire is to be crimped or slightly bent on one side of each strand wire, and this crimping or bending is accomplished through the operation of lower and upper crimper heads. The lower crimper heads are carried by a locking bar or member 218 at each end of which is an arm 219 mounted on a pivot 220 projecting out from a boss $i$ on the upright portion $d$ of the brackets or hangers hereinbefore described and mounted on the top rails 2 of the side frames. A link 221 is entered into a slot 222 in the cross head or member 218 and its upper end is attached by a pivot 223 to the head or member. The lower end of the link 221 carries a cross pin or stud 224 entered into a slot 225 of a vibratable arm or lever 226 mounted on a pivot 227 projecting out from the plate $f$ of each hanger or bracket support. Each arm or lever 226 has a continuation or extension forming an arm or lever 228 with a pivot or pin 229 at its end on which is mounted an arm or link 230 fixed at its lower end on a rock shaft 231 mounted in suitable bearings in the side frames of the machine. The shaft 231 has fixed thereto an arm or lever 232 at the outer end of which is a pin or stud $232^a$ carrying a roller $232^b$ which enters a cam groove having a concentric portion 233, a concentric portion $233^a$, and a projected portion 234 which groove is formed in the face of a cam 235 fixedly mounted on the shaft 22 so as to revolve with the shaft. The engagement of the roller $232^b$ by the cam groove of the cam or disk 235 rocks the shaft 231 and through the arm 230 oscillates the arm or lever 226 to cause the link 221 to raise and lower the head or member 218 on its pivotal supports. The cross head or member 218 has mounted thereon a plurality of housings 236 each housing secured to the cross head or member by bolts 237 or otherwise.

Each housing has fixed thereon a block 238 with a depression or recess 239 in its upper face, as shown in Fig. 13, which block 238 constitutes a crimping jaw for the stay wire, as many crimping jaws 238 being provided as there are strand wires. The upper crimper is formed by a cross head or member 240 having at each end an ear or arm 241 mounted on a pivot 242 projecting out from a boss $j$ on the vertical or upright flange $d$ of each bracket or hanger support. At each end of the cross head or member 240 is a slot or recess 243 in which is a pivot 244 to which is attached the upper end of a link or bar 245 the lower end of which carries a pivot 246 entered into an arm or lever 247 mounted on a pin or pivot 248 in an ear 249 attached to each side frame of the machine.

The free end of each arm or lever 247 carries a stud or journal pin 250 on which is a roller 251 entering a cam groove having concentric portions 252 and $252^a$ and depressed portions 253 on each side, which cam groove is formed in a cam or disk 254 fixedly attached to the shaft 18 for the cam or disk to revolve with the shaft. The engagement of the cam groove in the cam or disk 254 with the roller 251 of each arm or lever 247 raises and lowers the free end of the arm or lever giving a reciprocating movement to the bar or link 245 by which the cross head or member 240 is raised and lowered on its pivotal supports. The cross head or member 240 has a plurality of toes 255 into each of which is entered and secured a jaw or hammer 256 constituting the upper crimper, and, as shown, the under side of each toe is cut away so as to leave a depression or recess 257 for enabling the crimpers to operate with different spacing of strand wires.

The cams and connections for raising and lowering the cross heads or members 218 and 240 to actuate the crimping jaws of each cross head or member are so set and timed as to give the lower crimper or jaws an upward throw and to give the upper crimpers or jaws a downward throw coincidingly and at the proper time to crimp or bend the stay wire or picket on each side of the strand wire after the stay wire has been lowered or depressed to overlie the strand wires, and after the crimp or bend has been formed the cams for the respective cross heads or members 218 and 240 act to return the lower crimper or jaws to normal position by a descending movement and to return the upper crimper or jaws to normal position by a descending movement, releasing the stay wire and freeing the strand wires for the next feeding forward or advance of the strand wires. The crimpers or jaws in addition to crimping or bending the stay wire also serve as a clamp to retain the stay wire and the tie wires in position, holding the tie wire firmly while the end of the tie wire is being wound or coiled around the strand wires completing the attachment of the stay wire to each strand wire.

Each tie wire passes upwardly from the feed wheels through a hole 257 in the cross head or member 218 and through a hole 258 in alinement with the hole 257 and formed in a fixed cutter 259 by means of which and a movable cutter 260 each tie wire is severed after its descent so as to leave a projecting end of sufficient length for coiling around each strand wire. The movable cutter 260 is at the end of a sliding bar 261 movable in a suitable guideway of the housing 236 and at the cutter end of the slidable bar is a head or block 262 having a projecting portion 263 in which is a slot or recess 264 to engage the severed end of the tie wire and, with the advance of the sliding bar 261 push the end of the tie wire in position to be caught by the lip of the coiler encircling the strand wire for the rotation of the coiler head to wind or coil the end of the tie wire around the strand wire. The sliding bar 261 of the movable cutter is reciprocated, and, as shown, attached to its rear end is a link 265 one end of which receives a pivot 265$^a$ on the end of the cutter bar and the other end of which receives a pivot 265$^b$ on an arm 266 fixedly mounted on a rock shaft 267 suitably journaled at its ends in the hangers or bracket supports on each side frame. The rock shaft 267 has fixedly secured thereto the ends of two arms or levers 268 in the arrangement shown. Each arm or lever 268 at its free end has a journal pin or stud 269 on which is a roller 270 which engages a cam face having a concentric portion 271 and a projecting portion 272, which face is formed on the periphery of a cam or disk 273 fixedly attached to the shaft 22 so as to revolve with the shaft. The revolving of the cam or disk 223 causes its projected portion 272 to engage the roller 270 and raise the arm or lever 268 to rock the shaft 267 and advance the series of movable cutters through the connecting arms 266 and links 265, and after the acting end of each movable cutter has severed its tie wire the parts return to normal position as the roller 270 passes the projected portion 271 of the cam the arms or levers 268 falling by gravity and returning the movable cutters to normal position, and in normal position the rollers 270 lie on the concentric portion 271 of the cam. The cutters are actuated after the descent of the stay wire with the ends of the tie wires wound or coiled thereon, and when the stay wire and the tie wires have been caught and held by the jaws or clamps of the crimpers for the stay wire, leaving the ends of the stay wires free to be caught and wound or coiled around the strand wires.

A longitudinal beam 274 suitably supported within the frame of the machine has formed within its upper face a series of half boxes or semi-circular recesses furnishing a half box or bearing for the coiler or twister heads encircling the strand wires, and the journal box or bearing is completed by a half box 275 secured by bolts 276 or otherwise to the top of the cross beam 274 in the construction shown. A plurality of coiler or twister heads are mounted in the journal box or bearings and each coiler or twister head consists of a body 277 the acting end of which has a projecting lip 278 in proper relation to the descent of the stay wire, and the body of each coiler has a longitudinal hole 279 for the passage of the stay wire. The opposite end of the body of each coiler or twister head has fixed thereon a worm pinion 280 which meshes with a worm gear 281 fixedly secured to a shaft 282 mounted in suitable bearings or journal boxes 283 on the top rail of each side frame or otherwise supported. The shaft 282 at one end thereof projects beyond its journal box or bearing and has fixedly secured thereto a gear pinion 284 with which meshes a rack 285 supported in a suitable guide 286 on a table $k$ attached to the side frame of the machine. The rack bar 285 at its nonacting end has an ear 287 connected by a pivot 288 to an upturned end 289 at the end of a link or bar 290 the other end of which has a head 291 mounted on a pin or pivot 292 in the end of an arm or lever 293 the lower end of which is mounted on a shaft 131, the lower end of which has a socket or sleeve 294 mounted on the shaft 131, which shaft is supported in suitable journal boxes or bearings 135 on the frame of the machine, so that the shaft 131 is a fixed or dead shaft on which the arms or levers 126 and 293 can oscillate or rock. A pin or pivot 296 projects out from the arm or lever 293 and has mounted thereon the end of a bar or link 297 the end of which has a slot 297$^a$ with lips 297$^b$ entering grooves in the edge faces of a box 298 mounted on the shaft 22 so that the bar or link 297 is supported and is free to be reciprocated. A pin or stud 299 projects out from the bar or link 297 and carries a roller 300 which enters a cam groove having a concentric portion 301, a projecting portion 302 with a depressed portion 303 on each side and a straight portion 304, which groove is formed in the face of a cam or disk 305 fixedly attached to the shaft 22 and revolving with the shaft. The revolving of the cam or disk 305 through the engagement of the cam groove thereof with the roller 300 reciprocates the arm or link 297 to oscillate the arm or lever 293 to give the rack bar 285 a reciprocating movement by which the shaft 282 is given a direct revolution, revolving the worm gears 281 accordingly to revolve the series of twister or coiler heads encircling the strand wire forwardly to twist or wind the ends of the tie wires around the strand wires and leaving the coiler or twister heads in position to receive the next succeeding stay wire and twist or wind the tie wires around the strand wires uniting the stay wires to the strand wires. The reverse travel of the rack bar 285 does not impart rotation to the shaft 282 as the shaft 282 has fixed thereon a clutch section 306 having engaging flanges 307 to coact with engaging flanges 308 on a clutch section 309 connected with the driving pinion 284 so that on the reverse travel of the rack bar the clutch section 309 will revolve without imparting rotation to the clutch section 306 to drive the shaft. The construction shown has a brake-band 310 encircling the clutch section 309 and attached at one end to a stud or pin 311 projecting out from the side frame of the machine, and attached at its other end by means of a head 312 and a pin or pivot 313 to an eye or head 314 on the end of a rod or bar 315 the other end of which is attached to an arm 316 downwardly extending from a sleeve 317 mounted on a pin or pivot 318 extending out from a post or upright 319 on a bracket 320 attached to the side frame of the machine or otherwise secured in place. The rack bar has projecting out therefrom a stop 321 which engages a stop 322 on the rod or bar 315 at the terminus of the rearward movement so as to apply the brake-band and insure the stoppage of the coiler or twister heads in proper position for receiving the stay wire, and with the lip of each coiler head in position to engage the end of the tie wire and twist or wind the same around the strand wire, but this brake-band and its operating means are not absolutely necessary as the movement of the cam which operates the rack bar 285 can be so timed as to start and stop the coiler or twister heads at the proper moment and in correct position to perform their work.

The stay wire for the marginal strand wires is not fixed thereto by tie wires but the ends of the stay wire are coiled or wound around the marginal strand wires. The winding or coiling of the stay wire ends around the marginal strand wires is accomplished by the two outermost coiler or twister heads. Each coiler or twister head has bolted or otherwise secured thereto a plate 323 with an upwardly turned end 324 to which is secured a plate 325 having its upper end 326 bent toward the coiler or twister head, as shown in Fig. 10; and the plate 325 has therein an opening or hole 327 in line with the coiler head into which hole or opening projects a coiling pin 328 for engaging the end of the stay wire and winding or coiling the same around the marginal strand wire. The stay wire is advanced into position and held while its ends are being coiled or wound around the marginal strand wires by a pusher and clamp formed of a plate 329 having an opening 330 and attached to or formed with a plate 331 having a hole 332 for the passage of the strand wire and so arranged that the opening 330 will allow of the passage of the stay wire after its end has been coiled around the marginal strand wire as the strand wires are fed forward or advanced. The plate or packing 332 is attached to a slide bar corresponding to the slide bar 261, and like the slide bar, movable in the housing 236 with the slide bar connected by a link 265 to an arm 266 as in the case of the slide bars 261 carrying the movable cutters. The coiler heads for the marginal strand wires form two of the coiler or twister heads of the series and are operated as already described for revolving the coiler or twister heads of the strand wires.

A cross shaft 333 mounted in suitable journal boxes 334 on standards or supports 335 is located at the delivery end of the machine and above the main frame. This shaft 333 has fixedly attached to one end thereof a ratchet wheel 336 the teeth of which are engaged by a dog or pawl 337 mounted on a pin or pivot 338 projecting out from a plate 339 attached to the support 335 by bolts or otherwise. An acting dog or pawl 340 is arranged to engage the teeth of the wheel 336 on the opposite side from the stop pawl or dog, and this dog or pawl 340 is held in engagement with the ratchet teeth by a spring 341 attached to an ear or arm 342 having thereon the pivot 343 for the dog or pawl so that the dog or pawl is free to ride over the ratchet teeth in one direction or swing thereon to engage the ratchet teeth with the opposite direction of swing. The arm 342 extends out from a lever or arm 344 loosely mounted on the shaft 333, and the arm or lever 344 at its lower end is connected by a pin or pivot 345 with an ear 346 on a sleeve 347 through which sleeve the end of a rod 348 passes, which rod is screw threaded and has thereon jam or lock nuts 349 by means of which the sleeve can be adjusted to give the proper length of throw or oscillation of the arm or lever 344 to actuate the dog and advance the ratchet wheel, tooth by tooth, giving the shaft 333 an intermittent advance or rotation. The rod 348 at its other end is entered into a sleeve 349$^a$ and is held when engaged and adjusted by a jam or lock nut 349 operating on a screw threaded portion of the rod. The sleeve 349$^a$ is attached at its end by a pin or pivot 350 to a crank arm 351 fixedly attached to the shaft 22, and, as shown, the crank arm has a series of holes 352 by which the end of the sleeve can be adjusted nearer to or farther from the center of rotation of the shaft 22, so as to give a decreased or increased throw to the rod 348 to suit the requirements of the advance rotation for the shaft 333 to accommodate the position of the stay wires on the strand wires. The arrangement shown has on each side of the machine a pitman or connecting rod 348 and an arm or lever 344 with a ratchet wheel, an acting pawl and connections as just described, by which arrangement a direct drive is given to the shaft equally at each end, thereby preventing any side strain or twisting in the operation of the machine.

The shaft has fixedly mounted thereon a plurality of carrying wheels corresponding in number to the number of strand wires. Each wheel consists of an outer ring or rim 353 with radial spokes 354 connecting the ring or rim with a hub or center 355 fixedly attached to the shaft 333 in any suitable manner. The periphery of each ring or rim 353 has thereon two pins 356 and two pins 357 with the pins 356 arranged in staggered relation to the pins 357 and midway of the space between the pins 357 and separated a sufficient distance apart to leave a space between the two pins 357 and the two pins 356 for the admission of the strand wire with the tie wire adjacent to and in engagement with the center pin 356, which pins form the fixed jaw of a crimper. The movable jaw of each crimper is formed by a point 358 projecting above the periphery of the ring or rim of the wheel, and this point is on an arm or lever 359 having an ear 360 with a pivot 361 entered into a sliding block 362 located in a slot 363 of ears 364 on the spoke of the wheel, and the movable block 362 is engaged by an adjusting screw 365 so that the pivot 361 of the arm or lever 359 can be changed to set the jaw or point 358 in proper relation to the pins for crimping or bending the strand wires on one side of each stay wire. The inner end of each arm or lever 359 is attached by a pin or pivot 366 to a reciprocating bar 367 passing through slots or holes 368 formed in a web of each wheel between the spokes. Each bar 368 is of a length to extend across the full length of the wheels and project at its ends beyond the outermost wheel on each end. One end of each bar has thereon a head or block 369 which passes through a hole 370 formed in a guide consisting of a center 371 and an outer band 372, which guide is for the purpose of furnishing a support at the acting end of each slide bar 367 so as to hold the acting end stiff and rigid and against being twisted or bent when reciprocated. Each head 369 has ears 373 between which on a journal pin 374 is mounted a roller 375 for engagement with a cam 376 on a plate 377 bolted or otherwise secured to the support of the shaft 333 so that as the shaft revolves, carrying with it the wheels, the bars 367 will be inwardly pushed by the contact of the roller of each bar with the cam, and such inward movement of the several bars 367 carries with it the inner end of the levers 359 rocking the levers successively on their pivot pins as the rollers pass the cams and forcing the movable jaw or point toward the fixed point and bearing against the knot or wrap of the tie wire between the fixed pins 56 and crimping or bending the stay wire on one side of the tie and strand wire. The sliding bars 367 are returned to normal position after being advanced by their opposite ends engaging an incline 378 on a plate 379 fixed to the opposite support of the shaft 333 or otherwise attached to as to hold the incline in a fixed position and in proper relation for the ends of the sliding bars 367 to strike thereagainst and return the bars to normal position, and with such return of the bars to normal position the movable jaw or point is opened, allowing the strand wire and stay wire to pass to the delivery side for further disposition.

The several wheels having the fixed crimping jaws thereon constitute in effect a drum over which the strand wires with the stay wires fixed thereon run, and by which the strand wires are intermittently advanced through the step-by-step advance given to the drum from the drum 333 through the ratchet and pawl driving means, and any backward rotation of the drum is prevented by the engagement of the stop pawl 337 with the ratchet wheel. The strand wires with the stay wires fixed thereon pass under a guide roll 380 mounted on a shaft 381 supported in journal boxes 382 which are slidable in a frame 383 and are connected with a threaded stem 384 by means of which the journal boxes can be raised or lowered to give the proper tension to the fence in passing from the mechanism for attaching the stay wires to the strand wires by the tie wires onto the delivery drum having the crimpers for the strand wire thereon. The completed fence is wound onto a reel located on the delivery end of the machine below the crimping and feeding drum, which reel can be of any usual and well known form of construction and driven in any usual and well known manner.

The tie wires are advanced and receded by their feed wheels, as many tie wires being used as there are intermediate strand wires, one tie wire for each intermediate strand wire. The transverse wire 385 for the stay wires or pickets is advanced intermittently by its feed wheels 26 and 30 as required for use. The strand wires 386 are intermittently advanced by the rotation of the crimping drum, and as shown, each strand wire passes between guide rollers 387 at the receiving end of the machine.

The movements of the several elements can be briefly stated as follows: The feed wheels for the stay wires or pickets are started to advance the transverse wire across the machine the required distance for a stay wire or picket with the advance portion of the transverse wire held in the retaining fingers; when the required amount of transverse wire has been advanced the movable cutter is actuated to sever the stay wire or picket from the main transverse wire; the delivery fingers for the stay wire are then actuated to carry the severed stay wire or picket down into the upper twister or coiler heads. The feed mechanism for the tie wire is actuated to advance or push the tie wire with a projecting end above the stay wire or picket. The clamp for the stay wire or picket and the tie wire is advanced firmly holding the picket and the tie wire in position for coiling the end of a tie wire around the stay wire or picket; the plurality of upper twister or coiler heads are revolved in the direction to coil or wind the projecting end of each tie wire around the stay wire or picket with the longitudinal slot of each twister or coiler head vertically downward for escaping the stay wire or picket, and with the delivery fingers for the stay wire or picket returned to normal position; the feed mechanism for the several tie wires is given a reverse rotation, throwing down the tie wires and the stay wire or picket for the stay wire or picket to lie above the strand wires and in advance of the lower twister or coiler heads before which time the movable member or jaw of the picket or stay wire clamp has returned to normal position so as to leave a clear passage for the descent of the stay wire or picket; the cross heads or members of the crimper for the stay wire or picket are carried toward each other for the jaws to engage the stay wire or picket and crimp the same across and on one side of each strand wire; the movable cutter for each tie wire is advanced to sever the length of end for coiling or wrapping around the strand wires; the lower series of twister or coiler heads are revolved in the direction to coil or wind the tie wires around the intermediate strand wires and to coil or wind the ends of the stay wire or picket around the marginal strand wires; the movable cross heads or members of the crimpers for the stay wire or picket are receded from each other, releasing the strand wires with the stay wire or picket firmly fixed thereon so that the strand wires can be advanced the required distance to receive another stay wire or picket. The crimping and feeding drum is advanced, feeding the strand wires and the completed fence forward, and as a fixed stay wire or picket reaches the proper position in relation to the cam for moving the sliding crimpers on the wheels or drums the movable jaw of each crimper is advanced crimping or bending the strand wires on one side of the stay wire and completing the fence which is then wound onto a reel or otherwise disposed of.

The operation of the machine will be readily understood from the foregoing description of the movements of the several mechanisms. The mechanisms are actuated from their several cams or operating means in proper time to allow of the necessary interval in the advance of the stay wire or picket and the advance of the strand wires to apply the tie wires, but no time is lost as a new stay wire or picket can be advanced, severed and retained in position while the tie wires are being wrapped around the preceding stay wire or picket, and the strand wires can also be advanced during this time and with the dropping of the stay wire or picket and the tie wire into position for coiling or wrapping the ends of the tie wire around the strand wires the upper coilers or twisters can be returned to normal position to receive a new picket or stay wire delivered thereto by the fingers, and with the advance of the strand wires after the completion of securing a stay wire or picket thereto the tie wires can be advanced into position for their advance ends to be coiled or wound around the stay wires completing the operation at the cessation or nearly so of the advance of the strand wires. It will thus be seen that the several mechanisms have a coöperating relation in making the fence and that each mechanism is actuated at the proper time and under correct conditions to perform its work in feeding the stay wires or pickets, severing the same, feeding the tie wires, clamping the pickets or stay wires, winding or coiling the end of the tie wires around the stay wire or picket, depending the stay wire or picket over the strand wires, severing the tie wires, coiling or winding the ends of the tie wires around the strand wires and crimping the stay wires and the strand wires for the complete fence.

What I claim as new and desire to secure by Letters Patent is:

1. In a machine for making wire fence, the combination of means for intermittently feeding forward a plurality of strand wires, means for intermittently feeding forward a transverse wire, means for severing the advance portion of the transverse wire to form a continuous stay wire crossing the strand wires, means for advancing and receding a plurality of tie wires, means for severing the tie wires into coiling length, means for coiling the tie wires around the stay wires, means for coiling the tie wires around the strand wires at the crossing point of the stay wire and strand wires, means for crimping the stay wire on one side of each strand wire, and means for crimping the strand wires on one side of the stay wire, substantially as described.

2. In a machine for making wire fence, the combination of feed wheels intermittently actuated for feeding forward intermittently a transverse wire for its advance portion to overlie a plurality of strand wires, a fixed cutter, a movable cutter, means for operating the movable cutter to sever the advance portion of the transverse wire for a stay wire, retaining fingers supporting the severed stay wire, depressing fingers operating to remove the stay wire from the retaining fingers and deliver the removed stay wire to a series of coilers, and a series of coilers to which the stay wire is delivered, substantially as described.

3. In a machine for making wire fence, the combination of feed wheels intermittently actuated for feeding forward intermittently a transverse wire for its advance portion to overlie a plurality of strand wires, a fixed cutter, a movable cutter, means for operating the movable cutter to sever the advance portion of the transverse wire for a stay wire, retaining fingers supporting the severed stay wire, depressing fingers operating to remove the stay wire from the retaining fingers and deliver the removed stay wire to a series of coilers, a series of coilers to which the stay wire is delivered, a plurality of stay wires, means for feeding forward the plurality of tie wires to project their advance ends beyond the coilers supporting the stay wire for the coilers to wrap the projected ends of the tie wires around the stay wire, substantially as described.

4. In a machine for making wire fence, the combination of feed wheels intermittently actuated for feeding forward intermittently a transverse wire for its advance portion to overlie a plurality of strand wires, a fixed cutter, a movable cutter, means for operating the movable cutter to sever the advance portion of the transverse wire for a stay wire, retaining fingers supporting the severed stay wire, depressing fingers operating to remove the stay wire from the retaining fingers and deliver the removed stay wire to a series of coilers, a series of coilers to which the stay wire is delivered, a plurality of stay wires, means for feeding forward the plurality of tie wires to project their advance ends beyond the coilers supporting the stay wire for the coilers to wrap the projected ends of the tie wires around the stay wire, and means for clamping the advance portion of each tie wire adjacent to the stay wire for winding the end of each tie wire around the stay wire, substantially as described.

5. In a machine for making wire fence, the combination of feed wheels intermittently actuated for feeding forward intermittently a transverse wire for its advance portion to overlie a plurality of strand wires, a fixed cutter, a movable cutter, means for operating the movable cutter to sever the advance portion of the transverse wire for a stay wire, retaining fingers supporting the severed stay wire, depressing fingers operating to remove the stay wire from the retaining fingers and deliver the removed stay wire to a series of coilers, a series of coilers to which the stay wire is delivered, a plurality of tie wires, means for advancing and receding the plurality of tie wires for the advance to project the leading ends beyond the coilers supporting the stay wires for the coilers to wrap the leading ends of the tie wires around the stay wires and for the receding movement of the tie wires to drop the stay wire over the plurality of strand wires, substantially as described.

6. In a machine for making wire fence, the combination of feed wheels intermittently actuated for feeding forward intermittently a transverse wire for its advance portion to overlie a plurality of strand wires, a fixed cutter, a movable cutter, means for operating the movable cutter to sever the advance portion of the transverse wire for a stay wire, retaining fingers supporting the severed stay wire, depressing fingers operating to remove the stay wire from the retaining fingers and deliver the removed stay wire to a series of coilers, a series of coilers to which the stay wire is delivered, a plurality of tie wires, means for advancing and receding the plurality of tie wires for the advance to project the leading ends beyond the coilers supporting the stay wires for the coilers to wrap the leading ends of the tie wires around the stay wires and for the receding movement of the tie wires to drop the stay wire over the plurality of strand wires, and a clamp for each tie wire engaging the tie wire and holding it in position for coiling the end around the stay wire, substantially as described.

7. In a machine for making wire fence, the combination of a pair of feed wheels for feeding a tie wire, a shaft for each feed wheel, a driving pinion on one shaft, a meshing pinion on the companion shaft, a pair of racks both racks engaging the main driving pinion, and one rack having an increased action on the main driving pinion, and means for reciprocating the rack for giving a forward and reverse rotation to the feed wheels and bringing the tie wire into position, substantially as described.

8. In a machine for making wire fence, the combination of a pair of feed wheels for feeding a tie wire, a shaft for each feed wheel, a driving pinion on one shaft, a meshing pinion on the companion shaft, two racks engaging the main driving pinion one rack having a full length of cogs and the other rack having a partial length of cogs, and means for reciprocating both racks and giving one rack an increased action on the main driving pinion for operating the feed wheels in both directions, substantially as described.

9. In a machine for making wire fence, the combination of a pair of feed wheels for feeding a tie wire, a shaft for each feed wheel, a driving pinion on one shaft, a meshing pinion on the companion shaft, two racks engaging the main driving pinion one rack having a full length of cogs and the other rack having a partial length of cogs, means for reciprocating both racks, a revoluble cam having a groove and a connection between the cam and the full cogged rack bar, substantially as described.

10. In a machine for making wire fence, the combination of a pair of feed wheels for feeding a tie wire, a shaft for each feed wheel, a driving pinion on one shaft, a meshing pinion on the companion shaft, two racks engaging the main driving pinion one rack having a full length of cogs and the other rack having a partial length of cogs, means for reciprocating both racks, a revoluble cam having a groove and a connection between the cam and the partially cogged rack bar for giving one rack an increased travel in operating the main driving pinion, substantially as described.

11. In a machine for making wire fence, the combination of a pair of feed wheels for feeding a tie wire, a shaft for each feed wheel, a driving pinion on one shaft, a meshing pinion on the companion shaft, two racks engaging the main driving pinion one rack having a full length of cogs and the other rack having a partial length of cogs, means for reciprocating both racks consisting of a revoluble cam having a groove in both side faces, a connection between the cam on one side and the full cogged rack bar, and a connection between the cam on the opposite face and the partially cogged rack bar for giving an increase and decrease of travel for the feed wheels of the tie wires, substantially as described.

12. In a machine for making wire fence, the combination of a pair of feed wheels for feeding a tie wire, a shaft for each feed wheel, a driving pinion on one shaft, a meshing pinion on the companion shaft, two racks engaging the main driving pinion one rack having a full length of cogs and the other rack having a partial length of cogs, means for reciprocating both racks consisting of a revoluble cam having in its opposite faces grooves, an oscillating lever for each groove, a rock bearing, a connection between the rock bearing and the oscillating levers, and a connection between the rock bearing and the pair of rack-bars for giving the rack-bars an increased and decreased movement in revolving the feed wheels of the tie wire, substantially as described.

13. In a machine for making wire fence, the combination of a pair of feed wheels for feeding a tie wire, a shaft for each feed wheel, a driving pinion on one shaft, a meshing pinion on the companion shaft, two racks engaging the main driving pinion one rack having a full length of cogs and the other rack having a partial length of cogs, means for reciprocating both racks, a revoluble cam having in its opposite faces grooves, an oscillating lever for each groove, a rock bearing, a pair of arms on the rock bearing, links connecting the arms with the oscillating lever, substantially as described.

14. In a machine for making wire fence, the combination of a pair of feed wheels for feeding a tie wire, a shaft for each feed wheel, a driving pinion on one shaft, a meshing pinion on the companion shaft, two racks engaging the main driving pinion one rack having a full length of cogs and the other rack having a partial length of cogs, means for reciprocating both racks, consisting of a revoluble cam having in its opposite faces grooves, an oscillating lever for each groove, a rock bearing, a connection between the rock bearing and the oscillating levers, a pair of arms on the bearing, and a link connecting each arm with a rack-bar, substantially as described.

15. In a machine for making wire fence, the combination of a pair of feed wheels for feeding a tie wire, a shaft for each feed wheel, a driving pinion on one shaft, a meshing pinion on a companion shaft, two racks engaging the main driving pinion, one rack having a full length of cogs, the other rack having a partial length of cogs, means for reciprocating both racks, a revoluble cam having in its opposite faces grooves, an oscillating lever for each groove, a rock bearing, a pair of arms on the rock bearing, a connection between the rock bearing and the oscillating levers, and a link connecting each arm with a rack bar, substantially as described.

16. In a machine for making wire fence, the combination of means for intermittently advancing and receding a plurality of tie wires, a clamp for each tie wire, each clamp consisting of a fixed member and a movable member, and means for advancing and receding the movable member of the clamp, substantially as described.

17. In a machine for making wire fence, the combination of means for intermittently advancing and receding a plurality of tie wires, a clamp for each tie wire, each clamp consisting of a fixed member and a movable member, a deflecting lip on the bottom of the fixed member of the clamp, and means for advancing and receding the movable member of the clamp, substantially as described.

18. In a machine for making wire fence, the combination of means for intermittently advancing and receding a plurality of tie wires, a clamp for each tie wire each clamp consisting of a fixed member and a movable member, the fixed member having an acting end with jaws and a recess and the movable member having an acting end with jaws and slots, and means for advancing and receding the movable member of the clamp, substantially as described.

19. In a machine for making wire fence, the combination of means for intermittently advancing and receding a plurality of tie wires, a clamp for each tie wire, each clamp consisting of a fixed member and a movable member, the fixed member having an acting end with jaws and a recess and the movable member having an acting end with jaws and slots, and a deflecting finger for turning the tie wire end into position for coiling around a stay wire, and means for advancing and receding the movable member of the clamp, substantially as described.

20. In a machine for making wire fence, the combination of means for intermittently advancing and receding a plurality of tie wires, a clamp for each tie wire, each clamp consisting of a fixed member and a movable member, the fixed member having an acting end with jaws and a recess and the movable member having an acting end with jaws and slots, a sliding bar carrying the movable members of the series of clamps, and means for reciprocating the sliding bar, substantially as described.

21. In a machine for making wire fence, the combination of means for intermittently advancing and receding a plurality of tie wires, a clamp for each tie wire, each clamp consisting of a fixed member and a movable member, the fixed member having an acting end with jaws and a recess and the movable member having an acting end with jaws and slots, a sliding bar carrying the movable members of the series of clamps, guides supporting the sliding bar, a link connected with the sliding bar, a cam having a groove in its face, and a connection between the cam and the link, substantially as described.

22. In a machine for making wire fence, the combination of means for intermittently advancing and receding a plurality of tie wires, a clamp for each tie wire, each clamp consisting of a fixed member and a movable member, the fixed member having an acting end with jaws and a recess and the movable member having an acting end with jaws and slots, a sliding bar carrying the movable members of the series of clamps, guides supporting the sliding bar, a link connected with the sliding bar, a cam having a groove in its face, and a vibratable lever connected with the link, substantially as described.

23. In a machine for making wire fence, the combination of feed wheels for intermittently advancing a transverse wire, a fixed cutter for the transverse wire, a movable cutter coöperating with the fixed cutter, a rock shaft, a connection between the rock shaft and the movable cutter, a revoluble cam having a groove in its face, and a connection between the rock shaft and the cam for reciprocating the movable cutter and severing the transverse wire into a stay wire section, substantially as described.

24. In a machine for making wire fence, the combination of feed wheels for intermittently advancing a transverse wire, means for severing the advance portion of the transverse wire into a stay wire section, retaining fingers receiving the stay wire after severance, depressing fingers for transferring the stay wire from the retaining fingers to a plurality of coilers, and a plurality of coilers receiving the stay wire thereinto and sustaining the stay wire for winding thereon a plurality of tie wires, substantially as described.

25. In a machine for making wire fence, the combination of feed wheels for intermittently advancing a transverse wire, means for severing the advance portion of the transverse wire into a stay wire section, retaining fingers receiving the stay wire after severance, depressing fingers for transferring the stay wire from the retaining fingers to a plurality of coilers, a plurality of coilers receiving the stay wire thereinto and sustaining the stay wire for winding thereon a plurality of tie wires, and a clamp consisting of a fixed member and a movable member for guiding and holding the stay wire and the tie wires while coiling the tie wires around the stay wire, substantially as described.

26. In a machine for making wire fence, the combination of feed wheels for intermittently advancing a transverse wire, means for severing the advance portion of the transverse wire into a stay wire section, retaining fingers receiving the stay wire after severance, depressing fingers for transferring the stay wire from the retaining fingers to a plurality of coilers, a plurality of coilers receiving the stay wire thereinto and sustaining the stay wire for winding thereon a plurality of tie wires, a clamp consisting of a fixed member and a movable member for guiding and holding the stay wire and the tie wires while coiling the tie wires around the stay wire, and means for advancing and receding the movable member of the tie wire clamp, substantially as described.

27. In a machine for making wire fence, the combination of a lower oscillating cross head carrying a plurality of crimpers, an upper oscillating cross head carrying a plurality of crimpers, and means for oscillating both cross heads for the crimpers to act and bend a stay wire on one side of a plurality of strand wires, substantially as described.

28. In a machine for making wire fence, the combination of a lower oscillating cross head carrying a plurality of crimpers, an upper oscillating cross head carrying a plurality of crimpers, a link pivotally connected with the lower cross head, a rocking lever carrying the link, a revoluble cam, and a connection between the cam and the rocking lever for raising and lowering the lower cross head, substantially as described.

29. In a machine for making wire fence, the combination of a lower oscillating cross head carrying a plurality of crimpers, an upper oscillating cross head carrying a plurality of crimpers, a link connected with the upper cross head, an oscillating lever having the link connected thereto, a revoluble cam, and a connection between the revoluble cam and the oscillating lever for raising and lowering the upper cross head, substantially as described.

30. In a machine for making wire fence, the combination of a lower oscillating cross head carrying a plurality of crimpers, an upper oscillating cross head carrying a plurality of crimpers, a link connected with the lower cross head, a rocking lever carrying the link, a revoluble cam, a connection between the cam and the rocking lever, a link connected with the upper cross head, an oscillating lever having the link connected thereto, a revoluble cam and a connection between the revoluble cam and the oscillating lever for advancing and receding the acting faces of the cross heads, substantially as described.

31. In a machine for making wire fence, the combination of a lower oscillating cross head carrying a plurality of crimpers, an upper oscillating cross head carrying a plurality of crimpers, means for oscillating both cross heads for the crimpers to act and bend a stay wire on one side of a plurality of stand wires, a plurality of housings on the lower cross head, a plurality of fixed cutters on the cross heads, a plurality of movable cutters one for each fixed cutter, and means for reciprocating the movable cutters to sever the tie wires with a proper length of end for winding around the strand wires, substantially as described.

32. In a machine for making wire fence, the combination of a lower oscillating cross head carrying a plurality of crimpers, an upper oscillating cross head carrying a plurality of crimpers, means for oscillating both cross heads for the crimpers to act and bend a stay wire on one side of a plurality of strand wires, a plurality of housings on the lower cross head, a plurality of fixed cutters on the cross heads, a plurality of movable cutters one for each fixed cutter, a revoluble cam, and a connection between the revoluble cam and the movable cutters for reciprocating cutters, substantially as described.

33. In a machine for making wire fence, the combination of mechanism for overlaying a stay wire with one end of a plurality of tie wires wound thereon, a plurality of lower crimpers and clamps, a plurality of upper crimpers and clamps, and means for operating both sets of crimpers and clamps for crimping the stay wire on one side of a strand wire and holding the stay wire in position for winding the ends of the tie wires around the strand wires, substantially as described.

34. In a machine for making wire fence, the combination of mechanism for overlaying a stay wire with one end of a plurality of tie wires wound thereon, a plurality of lower crimpers and clamps, a plurality of upper crimpers and clamps, means for operating both sets of crimpers and clamps for crimping the stay wire on one side of a strand wire and holding the stay wire in position for winding the ends of the tie wires around the strand wires, a plurality of upper coilers for winding the ends of the tie wires around the stay wire when elevated, and means for revolving the upper coilers, substantially as described.

35. In a machine for making wire fence, the combination of mechanism for overlaying a stay wire with one end of a plurality of tie wires wound thereon, a plurality of lower crimpers and clamps, a plurality of upper crimpers and clamps, means for operating both sets of crimpers and clamps for crimping the stay wire on one side of a strand wire and holding the stay wire in position for winding the ends of the tie wires around the strand wires, and a plurality of lower coilers each coiler encircling a strand wire for winding the ends of a plurality of tie wires around the strand wires with the stay wire overlaying on the strand wires, substantially as described.

36. In a machine for making wire fence, the combination of mechanism for overlaying a stay wire with one end of a plurality of tie wires wound thereon, a plurality of lower crimpers and clamps, a plurality of upper crimpers and clamps, means for operating both sets of crimpers and clamps for crimping the stay wire on each side of a strand wire and holding the stay wire in position for winding the ends of the tie wires around the strand wires, a plurality of upper coilers for winding the ends of a plurality of tie wires around a stay wire in an elevated position, and a plurality of lower coilers one coiler around each strand wire for winding the ends of the plurality of tie wires around the strand wires with the stay wire overlaying on the strand wires, substantially as described.

37. In a machine for making wire fence, the combination of mechanism for overlaying a stay wire with one end of a plurality of tie wires wound thereon, a plurality of lower crimpers and clamps, a plurality of upper crimpers and clamps, means for operating both sets of crimpers and clamps for crimping the stay wire on one side of a strand wire and holding the stay wire in position for winding the ends of the tie wires around the strand wires, a plurality of upper coilers for winding the ends of a plurality of tie wires around a stay wire in an elevated position, a plurality of lower coilers one coiler around each strand wire for winding the ends of the plurality of tie wires around the strand wires with the stay wire overlaying on the strand wires, and mechanism for intermittently advancing and receding a plurality of tie wires, substantially as described.

38. In a machine for making wire fence, the combination of mechanism for overlaying a stay wire with one end of a plurality of tie wires wound thereon, a plurality of lower crimpers and clamps, a plurality of upper crimpers and clamps, means for operating both sets of crimpers and clamps for crimping the stay wire on one side of a strand wire and holding the stay wire in position for winding the ends of the tie wires around the strand wires, a plurality of upper coilers for winding the ends of a plurality of tie wires around a stay wire in an elevated position, a plurality of lower coilers one coiler around each strand wire for winding the ends of the plurality of tie wires around the strand wires with the stay wire overlaying on the strand wires, mechanism for intermittently advancing and receding a plurality of tie wires, and means for intermittently advancing a plurality of strand wires, substantially as described.

39. In a machine for making wire fence, the combination of a plurality of wheels onto and over which a plurality of strand wires lead, a series of pins on the periphery of each wheel, arranged in groups of two pairs of pins for each group spaced apart laterally and transversely with the two pins of one pair in staggered relation to the two pins of the other pair, the series of pins constituting a plurality of fixed jaws for a crimper, a movable finger constituting the movable jaw of a crimper, and means for operating the movable jaw to crimp the strand wires on one side of a stay wire, substantially as described.

40. In a machine for making wire fence, the combination of a plurality of wheels onto and over which a plurality of strand wires lead, a series of pins on the periphery of each wheel constituting a plurality of fixed jaws for a crimper, a movable finger constituting the movable jaw of a crimper, a slidable bar for each set of movable jaws of the crimpers, a roller at the end of each slidable bar, and a fixed cam engaging the roller and forcing the movable jaw of each crimper against the tie wire for crimping the strand wires, substantially as described.

41. In a machine for making wire fence, the combination of means for intermittently advancing a transverse stay wire, means for severing the leading portion of the transverse wire into a length of stay wire, means for retaining the stay wire after being severed, a plurality of upper coilers receiving thereinto a stay wire, means for depositing the stay wire into the coilers, and means for advancing and receding a plurality of tie wires for the leading ends to pass the tie wire in the coilers, substantially as described.

42. In a machine for making wire fence, the combination of means for intermittently advancing a transverse stay wire, means for severing the leading portion of the transverse wire into a length of stay wire, means for retaining the stay wire after being severed, a plurality of upper coilers receiving thereinto a stay wire, means for depositing the stay wire into the coilers, means for advancing and receding a plurality of tie wires for the leading ends to pass the tie wire in the coilers, and clamping means for holding the stay wire and the plurality of tie wires in position for the coilers to wind the ends of the tie wires around the stay wire, substantially as described.

43. In a machine for making wire fence, the combination of mechanism for coiling the ends of a plurality of tie wires around a stay wire in an elevated position, means for intermittently advancing and receding the tie wires with a variable distance of travel in advancing and receding, means for severing the plurality of tie wires when receded, and a mechanism for coiling the ends of the tie wires when receded around a plurality of strand wires, substantially as described.

44. In a machine for making wire fence, the combination of mechanism for coiling the ends of a plurality of tie wires around a stay wire in an elevated position, means for intermittently advancing and receding the tie wires with a variable distance of travel in advancing and receding, means for severing the plurality of tie wires when receded, a mechanism for coiling the ends of the tie wires when receded around a plurality of strand wires, and means for clamping the tie wires when receded for winding their ends around the strand wires, substantially as described.

45. In a machine for making wire fence, the combination of mechanism for coiling the ends of a plurality of tie wires around a stay wire in an elevated position, means for intermittently advancing and receding the tie wires with a variable distance of travel in advancing and receding, means for severing the plurality of tie wires when receded, a mechanism for coiling the ends of the tie wires when receded around a plurality of strand wires, and means for crimping the stay wire on one side of each strand wire and for holding the tie wires in position for the coiling of their ends around the strand wires substantially as described.

46. In a machine for making wire fence, the combination of mechanism for coiling the ends of a plurality of tie wires around a stay wire in an elevated position, means for intermittently advancing and receding the tie wires with a variable distance of travel in advancing and receding, means for severing the plurality of tie wires when receded, a mechanism for coiling the ends of the tie wires when receded around a plurality of strand wires, means for crimping the stay wire on one side of each strand wire and for holding the tie wires in position for the coiling of their ends around the strand wires, and means for crimping the strand wires at the stay wires, substantially as described.

47. In a machine for making wire fence, the combination of mechanism for coiling the ends of a plurality of tie wires around a stay wire in an elevated position, means for intermittently advancing and receding the tie wires with a variable distance of travel in advancing and receding, means for severing the plurality of tie wires when receded, a mechanism for coiling the ends of the tie wires when receded around a plurality of strand wires, means for crimping the stay wire on each side of each strand wire and for holding the tie wires in position for the coiling of their ends around the strand wires, and means for crimping the strand wires and intermittently advance the strand wires, substantially as described.

48. In a machine for making wire fence, the combination of an upper series of coilers for winding the ends of a plurality of tie wires around a stay wire in an elevated position, means for advancing the tie wires and receding the tie wires to deposit the stay wire over a plurality of strand wires, and a series of coilers for winding the ends of the plurality of tie wires around the strand wires, substantially as described.

49. In a machine for making wire fence, the combination of a series of upper coilers carrying a stay wire, means for advancing a plurality of tie wires above the stay wire, means for clamping the stay wire and the plurality of tie wires for winding the ends of the tie wires around the stay wire, means for receiving the tie wires with the stay wire to a position for the stay wire to overlie a plurality of strand wires, means for clamping the stay wire and the plurality of tie wires in the receded position, means for severing the tie wires and furnishing an end for winding around the strand wires, and a series of lower coilers for winding the ends of the tie wires around the strand wires, substantially as described.

50. In a machine for making wire fence, the combination of a series of upper coilers carrying a stay wire, means for advancing a plurality of tie wires above the stay wire, means for clamping the stay wire and the plurality of tie wires for winding the ends of the tie wires around the stay wire, means for receiving the tie wires with the stay wire to a position for the stay wire to overlie a plurality of strand wires, means for crimping the stay wire and clamping the stay wire and a plurality of tie wires in a receded position, means for severing the tie wires and furnishing an end for winding around the strand wires, and a series of lower coilers for winding the ends of the tie wires around the strand wires, substantially as described.

51. In a machine for making wire fence, the combination of a series of upper coilers carrying a stay wire, means for advancing a plurality of tie wires above the stay wire, means for clamping the stay wire and the plurality of tie wires for winding the ends of the tie wires around the stay wire, means for receiving the tie wires with the stay wire to a position for the stay wire to overlie a plurality of strand wires, means for crimping the stay wire and clamping the stay wire and a plurality of tie wires in a receded position, means for severing the tie wires and furnishing an end for winding around the strand wires, a series of lower coilers for winding the ends of the tie wires around the strand wires, and means for crimping the strand wires with the stay wires fixed thereon, substantially as described.

52. In a machine for making wire fence, the combination of a series of upper coilers carrying a stay wire, means for advancing a plurality of tie wires above the stay wire, means for clamping the stay wire and the plurality of tie wires for winding the ends of the tie wires around the stay wire, means for receiving the tie wires with the stay wire to a position for the stay wire to overlie a plurality of strand wires, means for clamping the stay wire and clamping the strand wire and plurality of tie wires in a receded position, means for severing the tie wires, a series of lower coilers for winding the ends of the tie wires around the strand wires, and means for crimping and intermittently advancing the strand wires with the stay wire fixed thereon, substantially as described.

53. In a wire fence loom, the combination of a line-wire feeding mechanism arranged to draw the line wires longitudinally through the machine, picket-wire feeding mechanism arranged to draw the picket wires transversely into the machine on a plane above the line wires, tie-wire feeding mechanism arranged to feed the tie wires upwardly into the machine in proximity to the picket wires, means for securing the tie wires and the picket wires together, and means for subsequently securing them to the line wires.

54. In a wire fence loom, the combination of a line-wire drawing mechanism, means for feeding picket wires into the machine on a plane above the line wires, means for feeding tie wires to the picket wire, means for fastening the two together, and means for fastening together the tie wires and line wires.

55. In a wire fence loom, the combination of a line-wire drawing mechanism, means for feeding picket wire into the machine at a plane above the line wires, means for feeding tie wires to the picket wire, means for connecting the two together, means for lowering the connected picket wire and tie wires to the plane of the line wires, and means for securing the tie wires to the line wires.

56. In a wire fence loom, a set of twisters arranged in a horizontal plane, a second set of twisters arranged in a plane below the first-named set, and means for first operating the first set of twisters, then lowering the wires to the second set of twisters, and means for subsequently operating said last-named set.

57. In a wire fence loom, the combination of mechanism for drawing line wires into the machine, tie-wire feeding mechanism, picket-wire feeding mechanism comprising rollers, means for intermittently operating said rollers, means for varying the throw of said rollers, an automatic operating severing device for the picket wire, and means for fastening the said wires together.

58. In a wire fence loom, the combination of mechanism for drawing line wires into the machine, a tie-wire feeding mechanism, suitable twisters, and a picket-wire feeding mechanism comprising transversely operated rollers, and a ratchet and pawl device for intermittently operating said rollers in one direction, and a reciprocating rack-bar arranged to actuate said ratchet.

59. In a wire fence loom, the combination of a line-wire drawing mechanism, a tie-wire feeding mechanism, suitable twisters, a picket-wire feeding mechanism comprising transversely operated rollers, and a ratchet and pawl device for intermittingly operating said rollers in one direction, and a reciprocating rack-bar arranged to actuate said ratchet and driven by a crank shaft, and means for varying the traverse of said rack-bar for the purpose set forth.

60. In a wire fence loom, the combination of feeding mechanism for the line wires, picket wire, and tie wires, a lower set of twisters designed to fasten the tie wires to the line wires, an upper set of twisters designed to fasten the picket wire to the tie wires, and means whereby said last-named twisters automatically drop the connected picket wire and tie wires to the lower set of twisters for a subsequent action thereby.

61. In a wire fence loom, the combination of a feeding mechanism for the line, tie and picket wires, automatic means for raising the tie wires contiguous to a picket wire, a picket clamp arranged to hold the picket wire at this point, and means for twisting a coil while the wire is held by said clamp.

62. In a wire fence loom, the combination of feeding mechanism for passing into the machine the line wires, the tie wires and picket wire, and an upper and a lower set of twisters for securing the tie wires to the picket wire and line wires respectively, and means for imparting to the tie-wire feeding mechanism a differential movement for the purpose set forth.

63. In a wire fence loom, the combination of mechanism for drawing line wires and feeding picket wire into the machine, an upper and a lower set of twisting devices, means for feeding tie wires to the picket wire for action by the upper set of twisters, and means whereby said tie-wire feeding means lowers the picket wire and tie wires to the lower set of twisters, which secure the same to the line wires.

64. In a wire fence loom, the combination of mechanism for drawing in the line wires and feeding picket wire, an upper and a lower set of twisters, the upper one of which is designed to operate on the picket wire and the lower upon the line wires, and a tie-wire feeding mechanism having a differential movement, whereby the tie wire will be passed to the upper set of twisters, then downward to the lower set of twisters, its movement being so arranged that the wire in its upward movement will be carried a greater distance than in its downward movement, for the purpose specified.

65. In a wire fence loom, the combination of mechanism for drawing in line wires and feeding tie wires and picket wire into the machine, twisters for fastening the tie wires to the picket wire, means for subsequently clamping the picket wire, twisters for fastening the tie wires to the line wires, and means for subsequently crimping the line wires.

66. In a wire fence loom, the combination of mechanism for drawing in line wires and feeding tie wires and picket wire into the machine, an upper set of twisters designed to coil the tie wires around the picket wire and arranged to subsequently discharge the same and drop the knot formed to the lower set of twisters, and means for automatically actuating said lower set of twisters.

67. In a wire fence loom, the combination of mechanism for drawing line wires and feeding tie wires and picket wire to the machine, twisters for coiling one end of the tie wires around the picket wire, means for automatically severing the tie wire below the knot, and other twisters for coiling the severed end of the tie wires around the line wires.

68. In a wire fence loom, a die block comprising a lower hinged member, means for securing the same in an upper operative position to support the wires when they are tied, and means for automatically lowering said block to permit the knot to pass outwardly from the machine.

69. In a wire fence loom, the combination of mechanism for drawing in line wires and feeding tie wires and picket wire into the machine, an upper and a lower set of twisters designed respectively to connect or fasten together the tie wires and the picket wire and the tie wires and the line wires, and reciprocating rack-bars arranged to actuate said twisters.

70. In a wire fence loom, the combination of mechanism for drawing line wires, tie wires, and picket wire into the machine, means for securing said wires together, and a drum for drawing the fabric from the machine, said drum being provided with studs and with fingers arranged to automatically press the line wires against said studs to crimp said wires.

71. In a wire fence loom, the combination of mechanism for drawing line wires, tie wires, and picket wire into the machine, means for fastening the same together, a crimping drum over which the wires travel in their passage from the machine, and a wind-up reel arranged to receive the wire from the said drum.

EARL BARTHOLOMEW.

Witnesses:
PAULINE BECKMAN,
OSCAR W. BOND.